(12) United States Patent
Akatsu et al.

(10) Patent No.: US 8,654,168 B2
(45) Date of Patent: Feb. 18, 2014

(54) OPTICAL SCANNING DEVICE, IMAGE FORMING APPARATUS, AND OPTICAL SCANNING DEVICE DESIGNING METHOD

(75) Inventors: Kazuhiro Akatsu, Kanagawa (JP); Seizo Suzuki, Chiba (JP); Masaaki Ishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/556,500

(22) Filed: Jul. 24, 2012

(65) Prior Publication Data

US 2013/0033558 A1  Feb. 7, 2013

(30) Foreign Application Priority Data

Aug. 3, 2011 (JP) ................................. 2011-170258
Nov. 17, 2011 (JP) ................................. 2011-251228

(51) Int. Cl.
B41J 15/14 (2006.01)
B41J 27/00 (2006.01)

(52) U.S. Cl.
USPC .......................................... 347/241; 347/256

(58) Field of Classification Search
USPC .......................... 347/229, 234–237, 246–250
See application file for complete search history.

(56) References Cited

U.S. PATENT DOCUMENTS

| 6,388,792 B1 | 5/2002 | Atsuumi et al. |
| 6,400,391 B1 | 6/2002 | Suhara et al. |
| 6,448,998 B1 | 9/2002 | Suzuki et al. |
| 6,509,995 B1 | 1/2003 | Suzuki et al. |
| 6,785,028 B1 | 8/2004 | Atsuumi et al. |
| 7,215,354 B1 | 5/2007 | Sakai et al. |
| 8,085,457 B2 * | 12/2011 | Ichii et al. ................... 359/212.1 |
| 8,094,179 B2 * | 1/2012 | Ichii ............................. 347/256 |
| 2001/0022343 A1 | 9/2001 | Sakai et al. |
| 2001/0026393 A1 | 10/2001 | Suzuki et al. |
| 2002/0080428 A1 | 6/2002 | Suzuki et al. |

(Continued)

FOREIGN PATENT DOCUMENTS

| JP | 8-330661 | 12/1996 |
| JP | 2002-040350 | 2/2002 |

(Continued)

OTHER PUBLICATIONS

U.S. Appl. No. 13/354,789, filed Jan. 20, 2012, Seizo Suzuki, et al.

(Continued)

*Primary Examiner* — Hai C Pham
(74) *Attorney, Agent, or Firm* — Oblon, Spivak, McClelland, Maier & Neustadt, L.L.P.

(57) ABSTRACT

An optical scanning device including a light source having multiple light emitters; an optical element to reflect and transmit the emitted light beams; a photodetector to receive the reflected light beams; an aperture having an opening to shape the transmitted light beams; a light deflector to deflect the transmitted light beams; and a scanning optics to guide the deflected light beams to a scanning surface. The quantity of each of the light beams received by the photodetector is not less than 0.01 mW, and the size of a light receiving surface of the photodetector is determined such that even when the full width at half maximum of the emitted light beams changes, the rate of change of the ratio of the quantity of the light beams detected by the photodetector to the quantity of the light beams passing through the opening of the aperture is not greater than 4%.

10 Claims, 13 Drawing Sheets

(56) References Cited

U.S. PATENT DOCUMENTS

| | | |
|---|---|---|
| 2002/0131137 A1 | 9/2002 | Suzuki |
| 2002/0196514 A1 | 12/2002 | Atsuumi et al. |
| 2003/0011891 A1 | 1/2003 | Suzuki et al. |
| 2003/0025785 A1 | 2/2003 | Nihei et al. |
| 2003/0067533 A1 | 4/2003 | Omori et al. |
| 2003/0081299 A1 | 5/2003 | Suzuki et al. |
| 2003/0107788 A1 | 6/2003 | Hayashi et al. |
| 2003/0128413 A1 | 7/2003 | Suzuki et al. |
| 2003/0133175 A1 | 7/2003 | Suzuki et al. |
| 2003/0156184 A1 | 8/2003 | Suzuki et al. |
| 2003/0156310 A1 | 8/2003 | Suzuki et al. |
| 2003/0179428 A1 | 9/2003 | Suzuki et al. |
| 2003/0218788 A1 | 11/2003 | Sakai et al. |
| 2004/0032482 A1 | 2/2004 | Ozasa et al. |
| 2004/0032631 A1 | 2/2004 | Amada et al. |
| 2004/0036762 A1 | 2/2004 | Nihei et al. |
| 2004/0036936 A1 | 2/2004 | Nakajima et al. |
| 2004/0090520 A1 | 5/2004 | Sakai et al. |
| 2004/0125199 A1 | 7/2004 | Omori et al. |
| 2004/0165240 A1 | 8/2004 | Suzuki et al. |
| 2004/0184125 A1 | 9/2004 | Suzuki |
| 2005/0024479 A1 | 2/2005 | Itabashi et al. |
| 2005/0045813 A1 | 3/2005 | Suzuki et al. |
| 2005/0089069 A1 | 4/2005 | Ozasa et al. |
| 2005/0093962 A1 | 5/2005 | Miyatake et al. |
| 2005/0094234 A1 | 5/2005 | Miyatake et al. |
| 2005/0099489 A1 | 5/2005 | Nihei et al. |
| 2005/0146596 A1 | 7/2005 | Nihei et al. |
| 2005/0179971 A1 | 8/2005 | Amada et al. |
| 2005/0219354 A1 | 10/2005 | Omori et al. |
| 2005/0243163 A1 | 11/2005 | Ozasa et al. |
| 2006/0285186 A1 | 12/2006 | Ishida et al. |
| 2007/0030548 A1 | 2/2007 | Nihei et al. |
| 2007/0058232 A1 | 3/2007 | Nakajima |
| 2007/0091163 A1 | 4/2007 | Omori et al. |
| 2007/0132828 A1 | 6/2007 | Ishida et al. |
| 2008/0019255 A1 | 1/2008 | Imai et al. |
| 2008/0088893 A1 | 4/2008 | Ishida et al. |
| 2008/0123160 A1 | 5/2008 | Omori et al. |
| 2008/0204841 A1 | 8/2008 | Suzuki et al. |
| 2008/0204852 A1 | 8/2008 | Amada et al. |
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0267662 A1 | 10/2008 | Arai et al. |
| 2008/0267663 A1 | 10/2008 | Ichii et al. |
| 2008/0284838 A1 | 11/2008 | Suzuki et al. |
| 2008/0291259 A1 | 11/2008 | Nihei et al. |
| 2008/0298842 A1 | 12/2008 | Ishida et al. |
| 2009/0065685 A1 | 3/2009 | Watanabe et al. |
| 2009/0074437 A1 | 3/2009 | Tanabe et al. |
| 2009/0091805 A1 | 4/2009 | Tanabe et al. |
| 2009/0167837 A1 | 7/2009 | Ishida et al. |
| 2009/0174915 A1 | 7/2009 | Nihei et al. |
| 2009/0175657 A1 | 7/2009 | Yoshii et al. |
| 2009/0195635 A1 | 8/2009 | Ishida et al. |
| 2009/0317137 A1 | 12/2009 | Akatsu et al. |
| 2010/0045767 A1 | 2/2010 | Nihei et al. |
| 2010/0118366 A1 | 5/2010 | Tokita et al. |
| 2010/0214637 A1 | 8/2010 | Nihei et al. |
| 2011/0169906 A1 | 7/2011 | Suzuki |
| 2011/0199657 A1 | 8/2011 | Ishida et al. |
| 2011/0228037 A1 | 9/2011 | Omori et al. |
| 2011/0304683 A1 | 12/2011 | Ishida et al. |
| 2011/0316959 A1 | 12/2011 | Saisho et al. |
| 2012/0099165 A1 | 4/2012 | Omori et al. |
| 2012/0176462 A1 | 7/2012 | Suzuki |

FOREIGN PATENT DOCUMENTS

| | | | |
|---|---|---|---|
| JP | 2006-091157 | 4/2006 | |
| JP | 2006091157 A * | 4/2006 | ............ G02B 26/10 |
| JP | 2006-332142 | 12/2006 | |
| JP | 2007-079295 | 3/2007 | |
| JP | 2008-268683 | 11/2008 | |
| JP | 2009-065064 | 3/2009 | |
| JP | 2009-216511 | 9/2009 | |
| JP | 2009216511 A * | 9/2009 | ................ B41J 2/44 |
| JP | 2010-217353 | 9/2010 | |

OTHER PUBLICATIONS

U.S. Appl. No. 13/473,278, filed May 16, 2012, Masaaki Ishida, et al.

* cited by examiner

OPTICAL SCANNING DEVICE, IMAGE FORMING APPARATUS, AND OPTICAL SCANNING DEVICE DESIGNING METHOD

CROSS-REFERENCE TO RELATED APPLICATIONS

This patent application is based on and claims priority pursuant to 35 U.S.C. §119 to Japanese Patent Applications Nos. 2011-251228 and 2011-170258, filed on Nov. 17, 2011 and Aug. 3, 2011, respectively, in the Japan Patent Office, the entire disclosure of which is hereby incorporated herein by reference.

FIELD OF THE INVENTION

The present invention relates to an optical scanning device. Particularly, the present invention relates to an optical scanning device to scan a surface of an object with light. In addition, the present invention also relates to an image forming apparatus using the optical scanning device. Further, the present invention relates to a method for designing an optical scanning device.

BACKGROUND OF THE INVENTION

When images are formed using electrophotographic image forming apparatus (such as optical printers, digital copiers and optical plotters), a light source using laser is typically used for the image forming apparatus. Such image forming apparatus include a photoreceptor drum serving as an image bearing member, and an optical scanning device having a light source to emit light flux (scanning light flux), a light deflector to deflect the emitted light flux to scan a surface (scanning surface) of the photoreceptor drum, thereby forming an electrostatic latent image on the surface of the photoreceptor drum. The thus formed electrostatic latent image is typically developed with a developer including a toner to form a toner image on the surface of the photoreceptor drum.

In the optical scanning device, the light flux emitted by the light source to scan the surface of the photoreceptor drum is modulated by image information of an original image, and therefore an electrostatic latent image corresponding to the original image is formed on the surface of the photoreceptor drum.

In such image forming apparatus, the light quantity of the light flux emitted by the light source tends to vary when the environmental temperature changes and/or after the image forming apparatus are repeatedly used for a long period of time. In this case, the potential of the electrostatic latent image also varies, thereby causing an uneven image density problem in that the image density of the output image (toner image) has uneven image density.

In attempting to prevent occurrence of the uneven image density problem, published unexamined Japanese patent applications Nos. 2006-332142, 2010-217353 and 2008-268683 have disclosed optical scanning devices performing an APC (Auto Power Control) operation such that part of light emitted by a light source is received as monitoring light by a photodetector such as a photodiode, and the output level of the light source is controlled based on the detection result.

However, it is difficult for the optical scanning devices to stably perform a scanning operation on a scanning surface without increasing the costs of the optical scanning devices.

In an optical scanning device using an edge emitting laser for the light source, the APC operation can be performed using light emitted backward by the edge emitting laser as monitoring light. However, a surface emitting laser cannot emit light backward unlike an edge emitting laser, and therefore it is difficult to provide an optical scanning device having a light source equipped with a monitoring photodetector. When a surface emitting laser is used for a light source, a light quantity controlling method in which part of light flux emitted by the surface emitting laser is branched using an optical element such as a beam splitter and a half mirror so as to be guided to a monitoring photodetector, and the APC operation is performed using the output from the photodetector is typically used.

Specifically, in attempting to perform light quantity controlling, a monitoring photodetector in which an aperture is arranged between a half mirror serving as an optical branching element and a collimator lens is proposed. It is described therein that by providing such an aperture, the ratio of the light quantity of a laser beam proceeding toward a photoreceptor drum after passing the half mirror to the light quantity of a laser beam proceeding toward the photodetector after reflected from the half mirror does not change, and therefore a stable APC operation can be performed.

In addition, a multi-beam light source device is proposed which includes a light source in which multiple light emitters are monolithically arranged in a main scanning direction; a coupling lens to convert the multiple light beams emitted by the multiple light emitters so as to have a predetermined focused state; and a supporter to integrally support the light source and the coupling lens. In this multi-beam light source device, the supporter includes a first supporting member which supports the coupling lens and which is rotatable on the optical axis of light beams emitted by the light source, and a second supporting member which supports the light source and which is set such that inclination of the first supporting member at the main scanning cross-section is adjustable.

Further, a monitoring device for detecting the light quantity of light flux emitted by a vertical cavity surface emitting laser (VCSEL) light source is proposed. Specifically, the monitoring device includes an aperture in which a main portion of light flux emitted by the VCSEL light source and having the largest light intensity passes through the center of the aperture; an optical separation element which reflects light incident to the vicinity of the aperture as a monitoring light reflux; a second aperture which restricts the diameter of the monitoring light reflux; and a photodetector to detect the monitoring light reflux passing through the second aperture.

However, the monitoring photodetector mentioned above has a drawback in that the length of the light path between the light source and the photodetector is long, and therefore the device has a large size.

In addition, the multi-beam light source device mentioned above has a drawback in that the device is seriously affected by variation of the divergence angle of light.

The monitoring device mentioned above has good light utilization efficiency because of performing monitoring using light, which is not used for image writing (scanning). In addition, since the second aperture is provided, deterioration of the light quantity detection precision caused by variation of the divergence angle of light can be prevented. However, the device is constituted of many parts such as the light source, the first aperture (light path branching member), the second aperture, a light receiving lens, and the photodetector, and therefore the device has high manufacturing costs while having a large size because the length of the light path between the light source and the photodetector is long. In addition, it is necessary to adjust the positions of the light receiving lens and the photodetector with high precision such that the monitoring light flux is satisfactorily focused on a proper position of the photodetector.

For these reasons, the inventors recognized that there is a need for an optical scanning device which can stably scan a surface of an object without increasing the costs thereof. In addition, there is a need for a light source which can detect light quantity with high precision without increasing the size thereof.

BRIEF SUMMARY OF THE INVENTION

As an aspect of the present invention, an optical scanning device for scanning a surface of an object with light is provided which includes a light source having multiple light emitters to emit light beams; an optical element located on a light path of the light beams emitted by the light source to reflect part of the light beams while transmitting residue of the light beams; a photoreceiver located on a light path of the light beams reflected by the optical element and including a photodetector having a light receiving surface to receive the light beams reflected by the optical element; an aperture having an opening to shape the light beams passing through the optical element; a light deflector to deflect the light beams passing through the opening of the aperture; and a scanning optics to guide the deflected light beams to the surface of the object. In this optical scanning device, the light quantity of each of the light beams received by the light receiving surface of the photodetector is not less than 0.01 mW. In addition, the size of the light receiving surface of the photodetector is determined in such a manner that even when the full width at half maximum (FWHM) of each of the light beams emitted by the light source changes, the rate of change of the ratio of the light quantity of the light beams received by the photodetector to the light quantity of the light beams passing through the aperture is not greater than 4%.

As another aspect of the present invention, an image forming apparatus is provided which includes at least one image bearing member; and an optical scanning device to scan a surface of the image bearing member with the light beams emitted by the light source while modulated with image information to form an electrostatic latent image on the surface of the image bearing member, wherein the optical scanning device is the optical scanning device mentioned above.

As yet another aspect of the present invention, a method for designing an optical scanning device is provided. The optical scanning device includes a light source having multiple light emitters to emit light beams; an optical element located on a light path of the light beams emitted by the light source to reflect part of the light beams while transmitting residue of the light beams; a photoreceiver located on a light path of the light beams reflected by the optical element and including a photodetector having a light receiving surface to receive the light beams reflected by the optical element; an aperture having an opening to shape the light beams passing through the optical element; a light deflector to deflect the light beams passing through the opening of the aperture; and a scanning optics to guide the deflected light beams to the surface of the object. The method includes determining the size of the light receiving surface of the photodetector in such a manner that the light quantity of each of the light beams received by the light receiving surface of the photodetector is not less than 0.01 mW and that even when the full width at half maximum (FWHM) of each of the light beams emitted by the light source changes, the rate of change of the ratio of the light quantity of the light beams received by the photodetector to the light quantity of the light beams passing through the aperture is not greater than 4%.

The aforementioned and other aspects, features and advantages will become apparent upon consideration of the following description of the preferred embodiments taken in conjunction with the accompanying drawings.

DETAILED DESCRIPTION OF THE INVENTION

Initially, an embodiment of the present invention will be described by reference to FIGS. 1-11.

Figure 1:
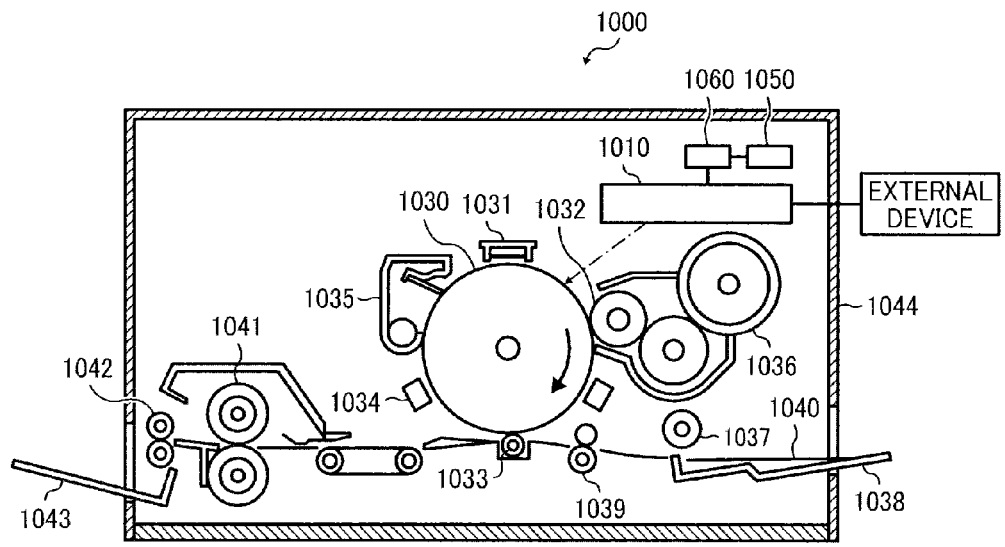
FIG. 1 is a schematic view illustrating a laser printer which is an example of the image forming apparatus of the present invention.

FIG. 1 illustrates a laser printer 1000, which is an example of the image forming apparatus of the present invention.

The laser printer 1000 includes an optical scanning device 1010, a photoreceptor drum 1030 serving as an image bearing member, a charger 1031, a developing device 1032, a transferring device 1033, a discharger 1034, a cleaner 1035, a toner cartridge 1036, a feed roller 1037, a receiving material tray 1038, a registration roller 1039, a fixing device 1041, a discharging roller 1042, a copy tray 1043, a communication controller 1050, a printer controller 1060 to control the above-mentioned devices, etc. These devices are set on predetermined places in a chassis 1044 of the laser printer 1000.

The communication controller 1050 controls two-way communication between the laser printer 1000 and an external device (e.g., personal computers) through a network.

The printer controller 1060 includes a CPU; a ROM storing programs described by codes, which can be read by the CPU, and data used for executing the programs; a RAM which serves as a working memory; an A/D converter to convert analogue data to digital data, etc. The printer controller 1060 controls the devices of the printer according to requests from an external device while sending image information to the optical scanning device 1010.

The photoreceptor drum 1030 has a cylindrical form, and includes a photosensitive layer on a surface thereof. The surface of the photoreceptor drum 1030 is the surface to be scanned by a laser beam emitted by the optical scanning device 1010. The surface to be scanned is hereinafter referred to as a scanning surface. The photoreceptor drum 1030 is rotated by a driving mechanism in a direction indicated by an arrow in FIG. 1.

The charger 1031 evenly charges the scanning surface of the photoreceptor drum 1030.

The optical scanning device 1010 scans the scanning surface of the photoreceptor drum, which has been charged by the charger 1031, with a light flux modulated according to image information sent from the printer controller 1060, thereby forming an electrostatic latent image, which corresponds to the image information, on the scanning surface of the photoreceptor drum 1030. The thus formed electrostatic latent image is moved toward the developing device 1032 as the photoreceptor drum 1030 is rotated. The optical scanning device 1010 will be described later in detail.

The toner cartridge 1036 contains a toner to be supplied to the developing device 1032.

The developing device 1032 adheres the toner, which is supplied to the developing device 1032 from the toner cartridge 1036, to the electrostatic latent image, which is formed on the scanning surface of the photoreceptor drum 1030, thereby forming a toner image on the scanning surface of the photoreceptor 1030. The thus formed toner image is moved toward the transferring device 1033 as the photoreceptor drum 1030 is rotated.

The recording material tray 1038 contains sheets of a recording material 1040 (such as paper sheets) therein. The feed roller 1037, which is provided in the vicinity of the recording material tray 1038, feeds the recording material sheets one by one from the recording material tray 1038. The recording material sheet 1040 fed by the feed roller 1037 is then fed toward a transfer nip between the photoreceptor drum 1030 and the transferring device 1033 by the registration roller 1039 so that the toner image on the scanning surface of the photoreceptor drum 1030 is transferred on a proper position of the recording material sheet 1040 at the transfer nip.

A voltage having a polarity opposite to the polarity of charge of the toner is applied to the transferring device 1033 so that the transferring device attracts the toner image on the scanning surface of the photoreceptor drum 1030, thereby transferring the toner image onto the recording material sheet 1040. The recording material sheet bearing the toner image thereon is fed toward the fixing device 1041.

The fixing device applies heat and pressure to the recording material sheet 1040 to fix the toner image to the recording material sheet. The recording material sheet 1040 bearing the fixed toner image thereon is discharged by the discharging roller 1042 from the main body of the laser printer 1000 so as to be stacked on the copy tray 1043.

The discharger 1034 discharges the scanning surface of the photoreceptor drum 1030 to decay residual charges remaining on the scanning surface of the photoreceptor drum 1030 even after the toner image is transferred onto the recording material sheet 1040.

The cleaner 1035 removes residual toner remaining on the scanning surface of the photoreceptor drum 1030 even after the toner image is transferred onto the recording material sheet 1040. The thus cleaned surface of the photoreceptor drum 1030 is returned to the charging position, at which the charger 1031 faces the photoreceptor drum 1030, as the photoreceptor drum 1030 is rotated.

Next, the optical scanning device 1010 will be described in detail.

Figure 2:
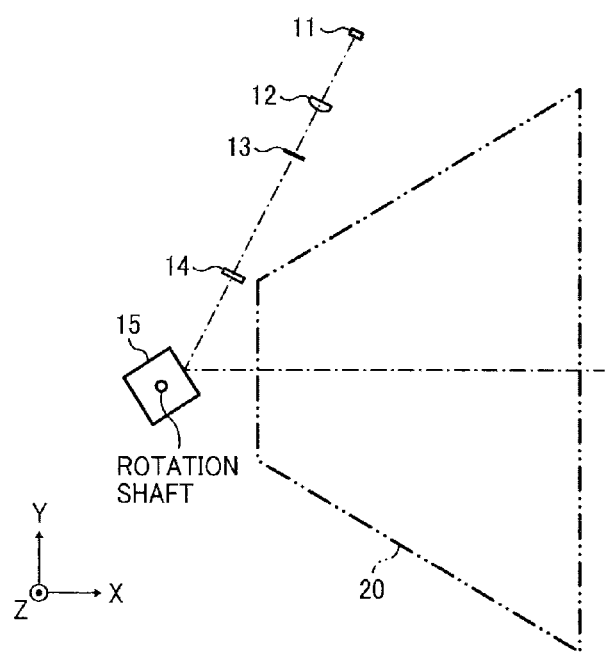
FIG. 2 is a schematic view illustrating an optical scanning device of the laser printer illustrated in FIG. 1.

An example of the optical scanning device 1010 is illustrated in FIG. 2. The optical scanning device includes a light source device 11, a coupling lens 12, an aperture 13, a cylindrical lens 14, a polygon mirror 15, a scanning optics 20, a scanning controller, etc. These devices are arranged on predetermined places in a housing.

Figure 5:
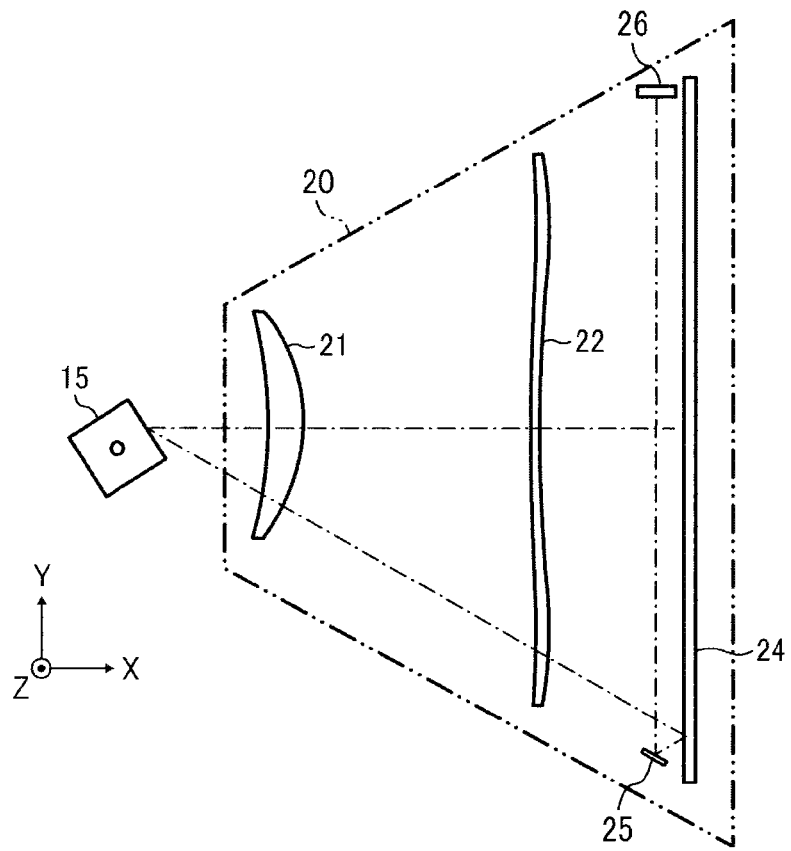
FIGS. 5 and 6 are schematic views illustrating a scanning optics for use in the optical scanning device of the present invention.
Figure 6:
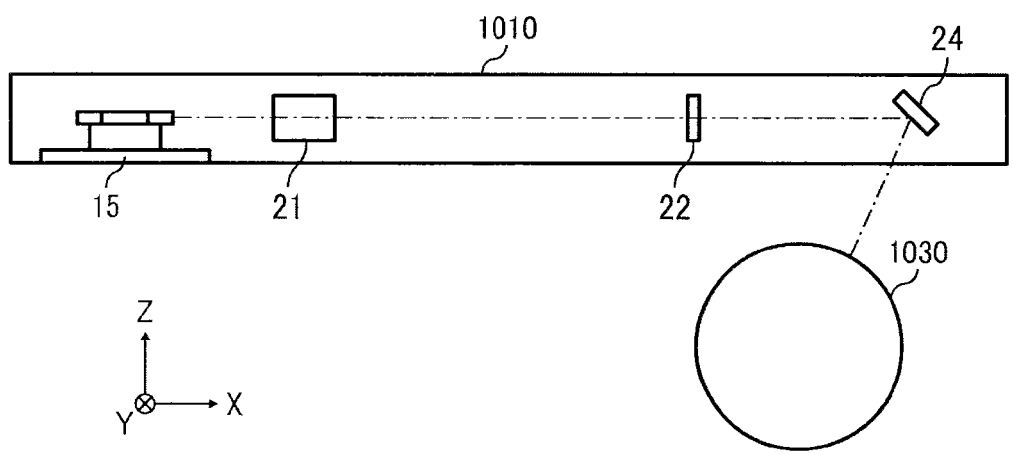

In this specification, a three dimensional XYZ Cartesian coordinate system is used for description, and the axial direction of the photoreceptor drum 1030 is the Y-axis direction, and the axial direction of the polygon mirror 15 is the Z-axis direction as illustrated in FIGS. 2, 5 and 6.

In this specification, the direction corresponding to the main scanning direction means the direction corresponding to the main scanning direction, along which a light beam scans the surface of the photoreceptor drum 1030 and which is the same as the axial direction of the photoreceptor drum 1030. In addition, the direction corresponding to the sub-scanning direction means a direction, which is perpendicular to the direction corresponding to the main scanning direction and along which the photoreceptor drum 1030 is rotated.

Figure 3:
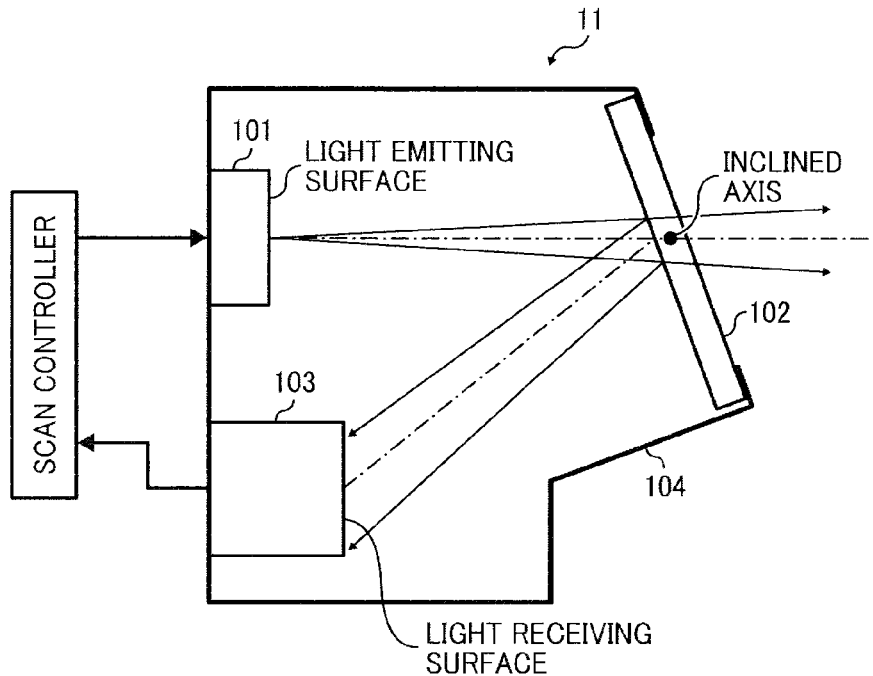
FIG. 3 is a schematic view illustrating a light source device for use in the optical scanning device of the present invention.

An example of the light source device 11 is illustrated in FIG. 3. The light source device 11 has a light source 101, a glass plate 102, a photodetector 103, a protective cover 104, etc.

Figure 4:
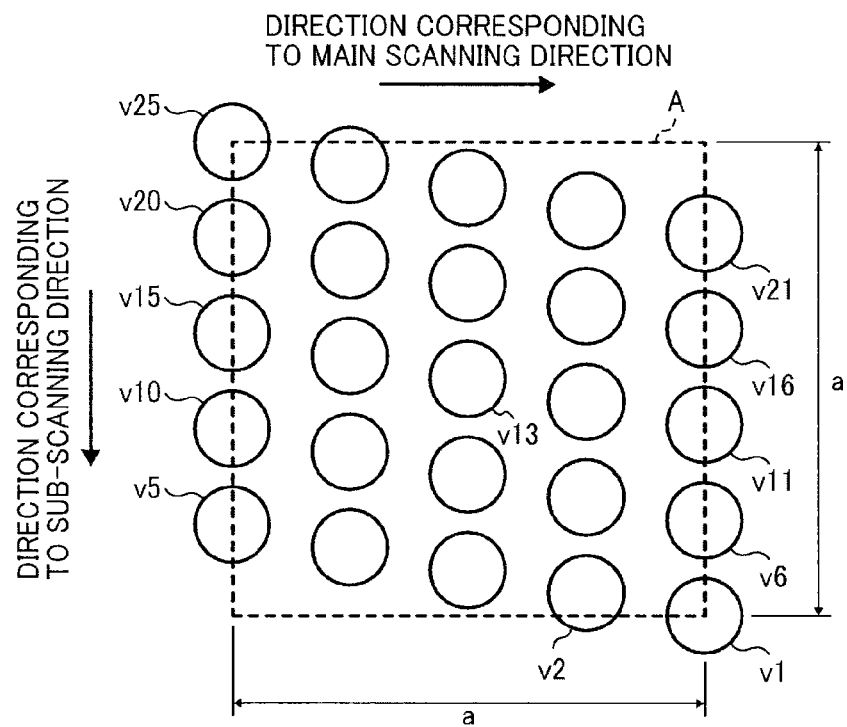
FIG. 4 is a schematic view illustrating a surface emitting laser array for use in the optical scanning device of the present invention.

An example of the light source 101 is illustrated in FIG. 4. The light source 101 has 25 light emitters v1-v25, which are arranged two-dimensionally as illustrated in FIG. 4. When the 25 light emitters v1-v25 are orthographically projected on a line parallel to the direction corresponding to the sub-scanning direction, the interval between any two adjacent light emitters (i.e., the distance between the center of a light emitter and the center of the adjacent light emitter) is constant.

As illustrated by a dotted line in FIG. 4, a box A, which has a side parallel to the direction corresponding to the main scanning direction and a side parallel to the direction corresponding to the sub-scanning direction and which has opposed corners at the light emitters v1 and v25, is a square whose sides have a length of a. Namely, the centers of the light emitters v1-v25 are located on the sides of the square A or in the square A. In addition, the center of the square A is the same as the center of the light emitters v1-v25 (i.e., the center of the light emitter v13).

Each of the light emitters v1-v25 is a surface emitting laser (VCSEL) emitting light having a wavelength of 780 nm. Namely, the light source 101 has a surface emitting laser array. The number of light emitters in the surface emitting laser array of the light source 101 is not limited to 25.

Referring back to FIG. 3, the glass plate 102 is arranged on the light path of light emitted by the light source 101, and reflects part of light emitted by the light source 101 while transmitting the residue of the light. Therefore, light passing through the glass plate 102 is used for scanning. In this regard, the glass plate 102 is arranged so as to be slanting relative to the light emitting surface of the light source 101.

The photodetector 103 is arranged on the light path of light reflected from the glass plate 102 to receive light reflected from the glass plate. In this regard, the photodetector 103 receives all of the light beams, which are emitted by the multiple light emitters v1-v25 and which are reflected from the glass plate 102. The light receiving surface of the photodetector 103 has a square shape. The photodetector 103 outputs a signal corresponding to the light quantity of light received thereby. In this regard, light reflected by the glass plate 102 is hereinafter referred to as light for monitoring.

In the light source device 11 illustrated in FIG. 3, the light emitting surface of the light source 101 is parallel to the light receiving surface of the photodetector 103, and therefore it is prevented that light reflected from the light receiving surface of the photodetector 103 returns to the light source 101. In addition, it is easy to manufacture a light source device having such a configuration as illustrated in FIG. 3.

The protective cover 104 is a box made by a metal, and the light source 101 and the photodetector 103 are contained therein. The protective cover 104 has a window, through which light emitted by the light source 101 passes and on which the glass plate 102 is provided. Namely, the light source 101 and the photodetector 103 are located in a closed space formed by the protective cover 104 and the glass plate 102, thereby preventing foreign materials from adhering to the light source 101 and the photodetector 103.

The light source device 11 further has a cable or a connector, on which a cable is provided, to electrically connect the light source 101 and the photodetector 103 with the scanning controller. The light source 101 is subjected to drive control by the scanning controller, and the signal output from the photodetector is sent to the scanning controller. The size of the photodetector will be described later.

Referring back to FIG. 2, the coupling lens 12 is provided on the light path of light emitted by the light source device 11 to change the light to substantially parallel light.

The aperture 13 has an opening to change the diameter of the light beam passing the coupling lens 12 to a desired diameter. The light passing through the opening of the aperture 13 is referred to as light for scanning (writing).

The cylindrical lens 14 allows the light beam passing through the opening of the aperture 13 to focus relative to the Z-axis direction on a location in the vicinity of the reflecting surface of the polygon mirror 15.

The optics arranged on the light path between the light source 101 and the polygon mirror 15 is called as a before-deflector optics.

The polygon mirror 15 has a four-face mirror rotating on a rotation axis, which is perpendicular to the rotation axis of the photoreceptor drum 1030. Each of the four faces of the mirror serves as a deflection/reflection surface. The four-face mirror of the polygon mirror 15 is rotated at a constant speed to deflect light from the cylindrical lens 14 at a constant angular speed.

The scanning optics 20 is arranged on the light path of light deflected by the polygon mirror 15. An example illustrated in FIG. 5 includes a first scanning lens 21, a second scanning lens 22, a light returning mirror 24, a mirror 25 for detecting synchronization, a synchronization detecting sensor 26, etc.

The first scanning lens 21 is arranged on the light path of light deflected by the polygon mirror 15.

The second scanning lens 22 is arranged on the light path of light passing through the first scanning lens 21.

The light returning mirror 24 changes the light path of light passing through the second lens 22 so as to proceed toward the photoreceptor drum 1030 as illustrated in FIG. 6.

Thus, light deflected by the polygon mirror 15 irradiates the scanning surface of the photoreceptor drum 1030 after passing through the first scanning lens 21, the second scanning lens 22, and the light returning mirror 24, thereby forming a light spot on the scanning surface of the photoreceptor drum 1030. In this regard, a light beam emitted by one of the light emitters v1-v25 forms one light spot on the scanning surface of the photoreceptor drum 1030.

The light spot formed on the scanning surface of the photoreceptor drum 1030 moves in the axis direction of the photoreceptor drum 1030 (i.e., the Y-axis direction) as the polygon mirror 15 rotates. In this regard, the moving direction of the light spot is the main scanning direction, and the rotation direction of the photoreceptor drum 1030 is the sub-scanning direction.

The mirror 25 for detecting synchronization reflects before-writing light, which has been reflected by the light returning mirror 24, to proceed toward the synchronization detection sensor 26 (i.e., to proceed in a+Y direction). The synchronization detection sensor 26 output a signal corresponding to the quantity of light received thereby to the scanning controller.

The scanning controller generates a writing signal (i.e., modulated signal) for each of the light emitters of the light source 101. In addition, the scanning controller determines the writing start time based on the signal output from the synchronization detection sensor 26, followed by outputting the writing signal to the light source 101 at the writing start time. Thus, the scanning surface of the photoreceptor drum 1030 is scanned with light modulated by image information.

Further, the scanning controller performs an APC (Auto Power Control) operation at a predetermined time based on the signal output from the photodetector 103.

Figure 7:
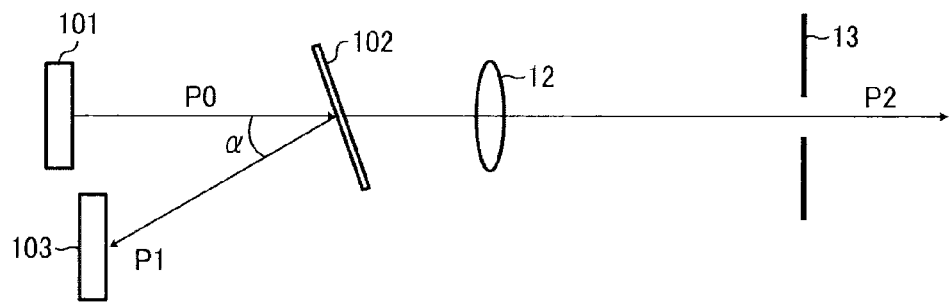
FIG. 7 is a schematic view for describing light quantities P0, P1 and P2, and a reflection angle α.

In this regard, as illustrated in FIG. 7, the quantity of light emitted by the light source 101 is P0, the quantity of light received by the photodetector 103 is P1, and the quantity of light passing through the opening of the aperture 13 is P2.

In addition, the glass plate 102 reflects light emitted by the light source 101 at a reflectance R while transmitting the light at a transmittance T. Further, the area of the light receiving surface of the photodetector 103 is S1, the area of the opening of the aperture 13 is S3, and the focal length of the coupling lens 12 is F.

Furthermore, as illustrated in FIG. 7, the reflection angle formed by the principal ray of the light flux incident to the glass plate 102 and the principal ray of the light flux reflected by the glass plate 102 is α. The length of the light path between the light source 101 and the photodetector 103 is L.

Hereinafter, an APC operation in which the quantity of light passing through the opening of the aperture 13 is controlled so as to be the desired light quantity is referred to as a proper APC operation.

The area of the light receiving surface of the photodetector 103 is preferably determined in consideration with the following points:

(a) The quantity of light received by the light receiving surface of the photodetector 103 is sufficient; and
(b) Change of the light quantity ratio P2/P1 is small even when the divergence angle of light emitted by the light emitters changes.

Initially, the point (a) will be described. When checking the light quantity of light emitted by the light sources, each of the light emitters is lighted one by one at a time in which the scanning operation (image writing operation) is not performed, and the photodetector 103 receives the light reflected from the glass plate 102. When the photodetector 103 receives the reflected light, the photodetector output a signal. When the signal output from the photodetector 103 is used for the APC operation without amplification, it is difficult to obtain only the signal due to dark current and external noises, and therefore a proper APC operation cannot be performed.

Therefore the output signal is amplified so as to be used for the APC operation. Even in such a case, the level of the output signal has a lower limit in consideration of oscillation and response speed, and the lower limit is typically 5 μA.

In addition, since a popular photodetector has a conversion efficiency of 0.5 (A/W), the quantity of light received by the photodetector is preferably not less than 10 μW (=5/0.5), i.e., 0.01 mW, in order to perform a proper APC operation.

The scanning controller flows the current generated in the photodetector to a 10 kΩ resistor to measure the voltage formed by the resistor. Therefore, when the current generated in the photodetector is 5 μA, a voltage of 50 mV, which is a detection voltage, is generated. The detection voltage is subjected to A/D conversion so as to be converted to 8-bit data (i.e., 256-step quantized data). In this regard, when the maximum detection voltage is 1500 mV, the voltage per one bit is about 6 mV. Namely, the minimum detection unit is 6 mV. In this regard, when the detection voltage is 50 mV and the minimum detection unit is 6 mV, the minimum detection unit is 12% of the detection voltage, i.e., the quantization error is 12%. Since this error is considered to be the upper limit, the detection voltage is preferably greater than 50 mV, i.e., the current is greater than 5 μA. Namely, the quantity of light received by the photodetector is preferably greater than 0.01 mW.

When the light quantity detection range is 30 times, i.e., when the detected light quantity is from 10 μW to 300 μW, a current of 150 μA is generated when the detected light quantity is maximal (i.e. 300 μW). In order to generate the maximum voltage (1500 mV) when the current is 150 μA, it is necessary to use a 10 kΩ resistor for the resistor, through which the current is flown.

Figure 8:
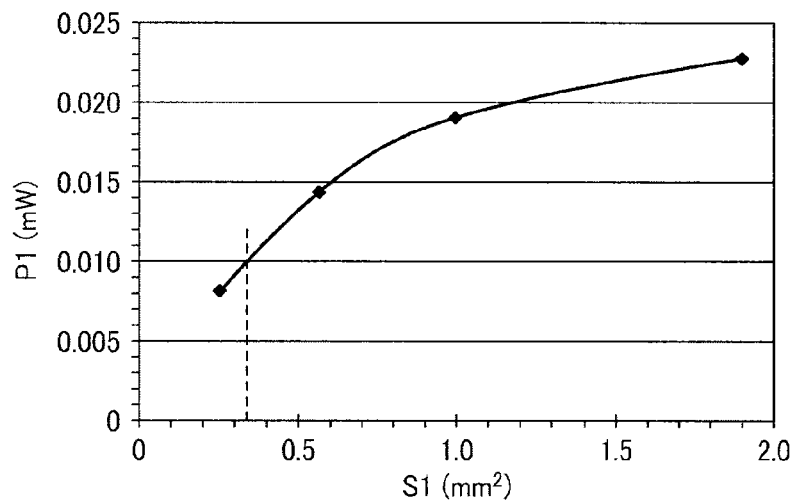
FIG. 8 is a graph showing relation between the light quantity P1 and the area S1 of the light receiving surface.

When the quantity P0 of light emitted by the light source is 0.3 mW, the reflectance R of the glass plate is 0.1, the length L between the surface of the light emitters and the glass plate is 5.4 mm, and the reflection angle α is 40°, the relation between the area S1 of the light receiving surface of the photodetector 103 and the quantity P1 of light, which is emitted by the light emitter v1 or v25 and which is received by the photodetector 103 is illustrated in FIG. 8. It can be understood from FIG. 8 that when the area S1 is not less than 0.34 mm², the photodetector 103 can obtain a light quantity of not less than 0.01 mW for light emitted by any one of the light emitters.

Figure 9:
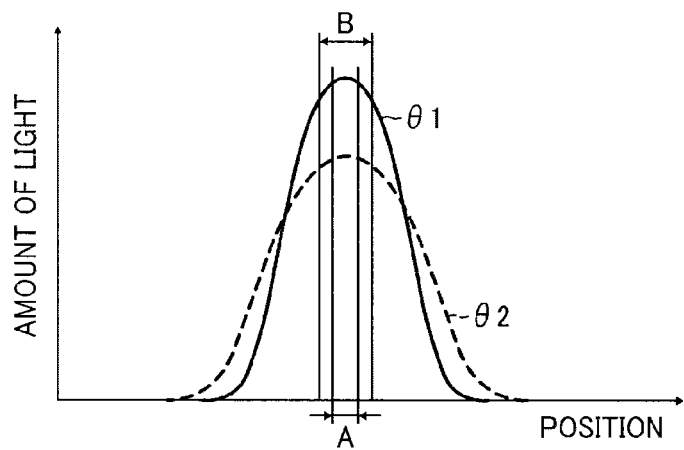
FIG. 9 is a graph illustrating the light intensity distribution of light emitted by a light source.
Figure 10:
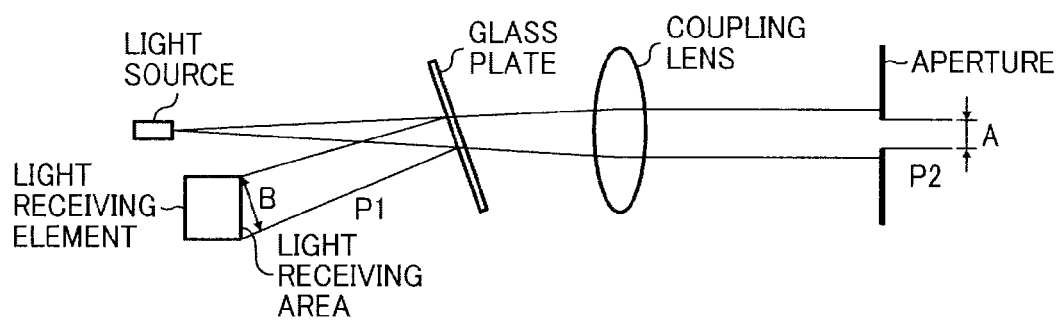
FIG. 10 is a schematic view for describing the characters A and B used for FIG. 9.

Next, the point (b) will be described. Even when the quantity of light emitted by the light emitters does not change, the full width at half maximum (FWHM) of light emitted by the light emitters changes after long repeated use of the light emitters or when the environmental temperature changes. In this case, the intensity profile of light changes as illustrated in FIG. 9.

In general, it is preferable for an image forming apparatus to increase the quantity of light used for scanning the scanning surface of the photoreceptor drum to prepare a clear electrostatic latent image having a large potential difference, and therefore the quantity of light reflected by the glass plate 102 (i.e., light for monitoring) is small. Therefore, it is preferable for the photodetector 103 to receive greater part of light reflected by the glass plate 102. Accordingly, in general it is designed such that a light receiving length B of the photoreceptor in a direction (illustrated in FIG. 10) is greater than a length A (also illustrated in FIG. 10) of a side of the opening of the aperture.

In this case, when the full width at half maximum (FWHM) of light emitted by the light source changes after long repeated use of the light emitters or when the environmental temperature changes, the ratio P2/P1 often changes. In this case, if an APC operation is performed, the APC operation is not the proper APC operation.

When the ratio P2/P1 changes, the energy of light for scanning also changes to substantially the same degree. In addition, the image density of an output image is substantially proportional to the energy of light for scanning. Therefore, when the ratio P2/P1 changes, the image density also changes to substantially the same degree.

When a sensory test in which two images which have a dot area proportional of 70% but which have different image densities are visually compared is performed, the images can be visually distinguished from each other if the image density difference is not less than 4%. This means that when change of the ratio P2/P1 is not less than 4%, the output images can be visually distinguished from each other. Therefore, the maximum value of the change of the ratio P2/P1 is 4%.

In this regard, it is provided that when the full width at half maximum (FWHM) of light emitted by the light source is θ1, the quantity of light received by the photodetector 103 is P21, and the quantity of light passing through the opening of the aperture 13 is P31. In addition, it is provided that when the full width at half maximum (FWHM) of light emitted by the light source is θ2, the quantity of light received by the photodetector 103 is P22, and the quantity of light passing through the opening of the aperture 13 is P32.

Namely, when the full width at half maximum (FWHM) of light emitted by the light source is θ1, the ratio P2/P1 is P31/P21, and when the full width at half maximum (FWHM) of light emitted by the light source is θ2, the ratio P2/P1 is P32/P22.

In this case, the rate of change (ΔP) of the ratio P2/P1 caused when the full width at half maximum (FWHM) changes from θ1 to θ2 is represented by the following equation (1):

$$\Delta P = \{(P32/P22 - P31/P21)/(P31/P21)\} \times 100 \quad (1)$$

wherein (P32/P22)>(P31/P21).

Figure 11:
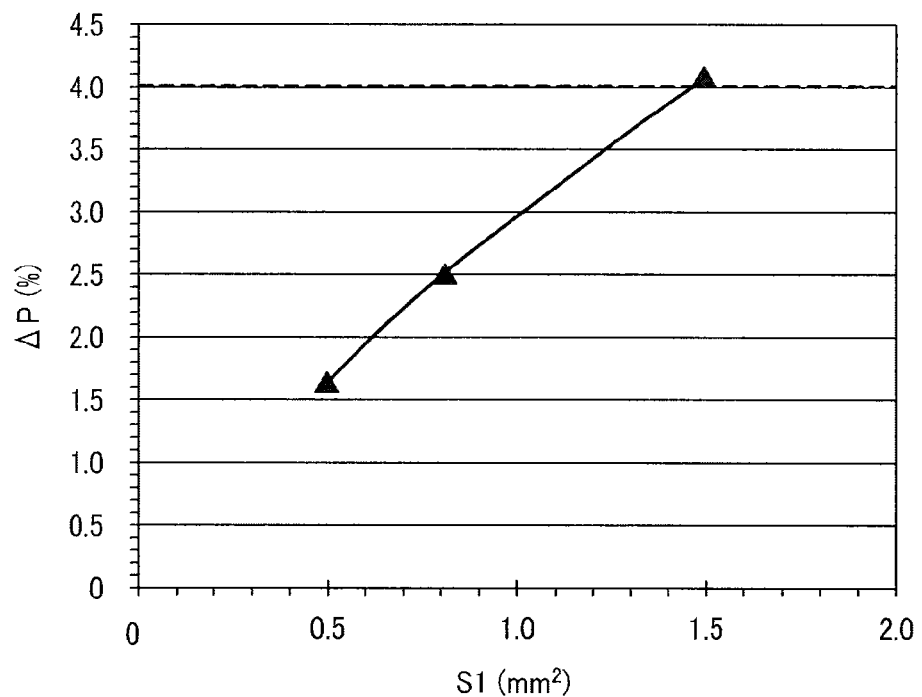
FIG. 11 is a graph showing relation between the area (S1) of the light receiving surface and the rate of change (AP) of the light quantity ratio (P2/P1)

In an example of the light source, in which the length L between the surface of the light emitters and the glass plate is 5.4 mm, the reflectance R of the glass plate is 0.1, the transmittance T of the glass plate is 0.9, the focal length F of the coupling lens is 45 mm, and the area S3 of the opening of the aperture is 6.72 mm² (the length in the direction corresponding to the main scanning direction is 5.6 mm, and the length in the direction corresponding to the sub-scanning direction is 1.2 mm), and the full width at half maximum (FWHM) changes from 7.7619° to 7.781° when the environmental temperature changes from 10° C. to 60° C., the relation between the area S1 of the light receiving surface of the photodetector and the rate of change (ΔP) is illustrated in FIG. 11.

It can be understood from FIG. 11 that when the area S1 of the light receiving surface of the photodetector is not greater than 1.5 mm², the rate of change (ΔP) is not greater than 4%.

Since the area S1 of the light receiving surface of the photodetector is not less than 0.34 mm² in order to fulfill the condition of the above-mentioned point (a), and is not greater than 1.5 mm² in order to fulfill the condition of the above-mentioned point (b), the area S1 is not less than 0.34 mm² and is not greater than 1.5 mm² in order to perform a proper APC operation. In this regard, the shape of the light receiving surface of the photodetector is not limited to a box-shape, and may be a circular shape.

As mentioned above, the optical scanning device 1010, which is an example of the optical scanning device of the present invention, includes the light source device 11, the coupling lens 12, the aperture 13, the cylindrical lens 14, the polygon mirror 15, the scanning optics 20, the scanning controller, etc.

The light source device 11 includes the light source 101, the glass plate 102, the photodetector 103, the protective cover 104, etc.

In addition, in the optical scanning device 1010, the quantity P0 of light emitted by the light source is 0.3 mW, the length L between the surface of the light emitters and the glass place is 5.4 mm, the reflection angle α is 40°, the reflectance R of the glass plate is 0.1, the transmittance T of the glass plate is 0.9, the focal length F of the coupling lens is 45 mm, and the area S3 of the opening of the aperture is 6.72 mm² while the area S1 of the light receiving surface of the photodetector is set in a range of from 0.34 mm² to 1.5 mm².

Namely, in the optical scanning device 1010, the size of the photodetector is determined to fulfill a condition in which when the quantity of each of light beams emitted by the multiple light emitters and received by the photodetector 103 is not less than 0.01 mW, and the full width at half maximum (FWHM) of each of the light beams emitted by the multiple light emitters changes from a first FWHM to a second FWHM, the rate of change (ΔP) of the ratio P2/P1 of the quantity P2 of light passing through the opening of the aperture to the quantity P1 of light received by the photodetector is not greater than 4%.

In this case, the quantity of light received by the photodetector 103 is sufficient for performing a proper APC operation, and it is possible to reduce the change of the ratio P2/P1 for each of the light emitters of the light source 103.

It is necessary for the conventional optical scanning device disclosed in Example 4 of the above-mentioned publication JP2006-332142A to have a beam splitter for performing beam splitting, and a mechanism for supporting and adjusting the beam splitter. In addition, a space for the beam splitter is necessary for the optical scanning device. Therefore it is difficult for the optical scanning device to have a low cost and a small size.

It is necessary for the conventional optical scanning device disclosed in the above-mentioned publication JP2010-217353A to have a splitting element, a reflecting mirror, a focusing lens, a supporter, and an adjusting mechanism therefor. Therefore, spaces for the devices are necessary for the optical scanning device. Accordingly, it is difficult for the optical scanning device to have a low cost and a small size.

It is necessary for the conventional optical scanning device disclosed in FIG. 8 of the above-mentioned publication JP2008-268683A to have a splitting element, a focusing lens, and a supporting and adjusting mechanism therefor. Therefore, spaces for the devices are necessary for the optical scanning device. Accordingly, it is difficult for the optical scanning device to have a low cost and a small size.

In contrast, a focusing lens is not necessary for the light source device 11 of the optical scanning device 1010, and therefore the light source device 11 has a simple structure, and the optical scanning device can have a low cost and a small size.

In the optical scanning device 1010, a proper APC operation can be always performed on each of the multiple light emitters without increasing the costs. Therefore, the scanning surface of the photoreceptor drum can be stably scanned.

The laser printer 1000, which is an example of the image forming apparatus of the present invention, is equipped with the optical scanning device 1010. Therefore, high quality images can be stably produced without increasing the costs of the image forming apparatus.

In the optical scanning device mentioned above, the coupling lens 12 can be replaced with a coupling optics including multiple lenses.

In addition, the cylindrical lens 14 can be replaced with a linear image forming optics including multiple lenses.

In the optical scanning device mentioned above, the wavelength of light emitted by the light emitters is 780 nm, but the wavelength is not limited thereto. The wavelength can be changed depending on the properties of the photoreceptor used.

Figure 12:
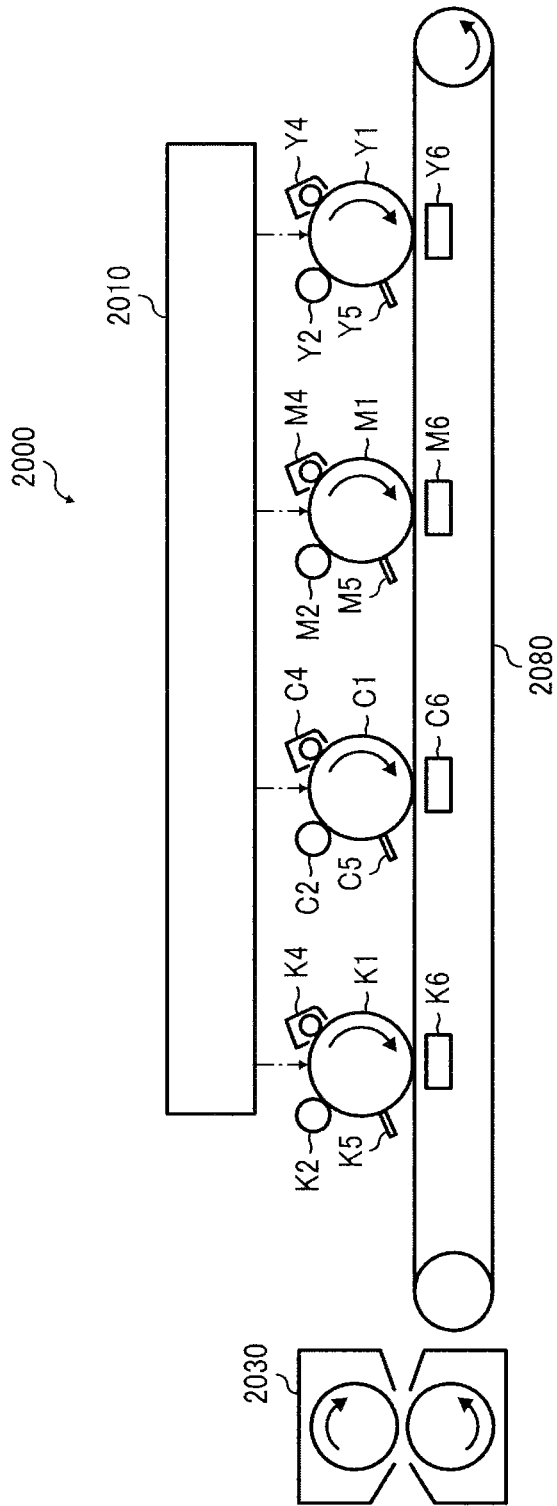
FIG. 12 is a schematic view illustrating a color laser printer which is another example of the image forming apparatus of the present invention.

In addition, the laser printer 1000 is described as an example of the image forming apparatus of the present invention, but the image forming apparatus of the present invention is not limited thereto. For example, the image forming apparatus of the present invention may be a color printer 2000 illustrated in FIG. 12, which has multiple photoreceptor drums.

The color printer 2000 is a tandem multi-color printer, which can form a full color image by overlaying four color images (such as black, cyan, magenta and yellow color images). The printer 2000 includes devices for forming black color images including a photoreceptor drum K1, a charger K2, a developing device K4, a cleaner K5, and a transferring device K6; devices for forming cyan color images including a photoreceptor drum C1, a charger C2, a developing device C4, a cleaner C5, and a transferring device C6; devices for forming magenta color images including a photoreceptor drum M1, a charger M2, a developing device M4, a cleaner M5, and a transferring device M6; devices for forming yellow color images including a photoreceptor drum Y1, a charger Y2, a developing device Y4, a cleaner Y5, and a transferring device Y6; an optical scanning device 2010, a transfer belt 2080, and a fixing device 2030.

The chargers evenly charge the surfaces of the respective photoreceptor drums. The optical scanning device 2010 irradiates the surfaces of the photoreceptor drums with light beams to form electrostatic latent images on the surfaces of the photoreceptor drums. The developing devices develop the electrostatic latent images on the surfaces of the photoreceptor drums with color toners to form color toner images on the surfaces of the photoreceptor drums. The transferring devices transfer the respective color toner images to a recording material sheet fed by the transfer belt 2080 to form a combined color image, in which the color toner images are overlaid, on the recording material sheet. The fixing device 2030 fixes the combined color toner image to the recording material sheet, resulting in formation of a multi-color image.

The optical scanning device 2010 has multiple light sources, which have the same configuration as that of the light source device 11 mentioned above and which are used for forming electrostatic latent images on the respective photoreceptors. The optical scanning device 2010 can produce the same effects as those of the optical scanning device 1010 mentioned above. In addition, since the color printer 2000 has the optical scanning device 2010, the color printer can produce the same effects as those of the laser printer 1000 mentioned above.

The color printer 2000 may cause a color image misalignment problem in that color images are formed while misaligned due to manufacturing errors of parts used for the printer and variation of mounting positions of the parts. However, by lighting light emitters properly selected from the multiple light emitters, the degree of color image misalignment can be decreased.

The image forming apparatus of the present invention is not limited to electrophotographic image forming apparatus such as the laser printers 1000 and the color printer 2000. For example, the present invention can be used for image forming apparatus which directly irradiate a medium with a laser beam so that the irradiated portion of the medium colors.

In addition, the optical scanning device of the present invention can be used for image forming apparatus which directly irradiate a reversible medium (such as rewritable paper) with a laser beam so that the irradiated portion of the medium colors or discolors. Namely, in these image forming apparatus, by controlling the heat energy of a laser beam, displaying and erasing are reversibly performed.

Hereinbefore, a case where the optical scanning device 1010 is used for a printer is described. However, the optical scanning device of the present invention can be used for copiers, facsimiles, and multifunction products having two or more functions such as copying, printing and facsimileing functions.

In addition, the optical scanning device of the present invention can be used for image forming apparatus which use a silver halide photosensitive film as the image bearing member (recording material). In this case, by irradiating a silver halide photosensitive film with a laser beam, a latent image is formed in the silver halide photosensitive film. The latent image is subjected to the same development process as that used for silver halide photography to be visualized. By subjecting the developed latent image to the same printing process as that used for silver halide photography, an image can be formed on a photographic printing paper. These image forming apparatus can be used for optical plate making apparatus, and optical drawing apparatus which draw CT scan images or the like.

Further, the optical scanning device of the present invention can be used for image forming apparatus (Computer to Plate, CTP) which make a printing plate. In this case, the optical scanning device directly forms an image on a material for a printing plate using laser ablation.

Figure 13:
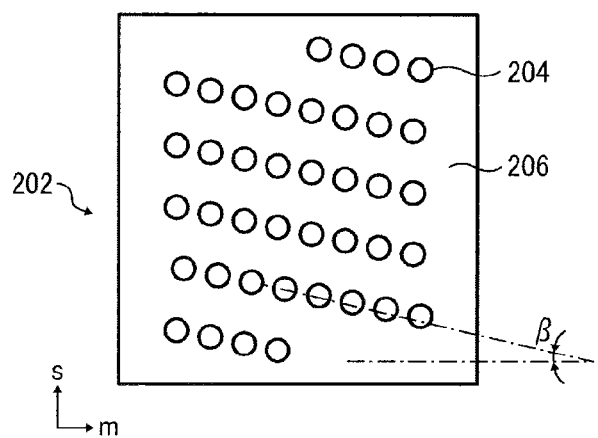
FIG. 13 is a schematic view illustrating a surface emitting laser for use in the optical scanning device of the present invention.

Next, another example of the light source of the present invention will be described. FIG. 13 illustrates a surface emitting laser (VCSEL) for use in the light source of the optical scanning device of the present invention. A surface emitting laser 202 illustrated in FIG. 13 has a two-dimensional structure such that multiple light emitters 204 are formed on a substrate 206.

In this example, forty (40) light emitters are arranged at an angle β on a two-dimensional plane as illustrated in FIG. 13. Each of the light emitters is a vertical cavity surface emitting laser (VCSEL) emitting light with a wavelength of 780 nm. Namely, the light source 202 is a surface emitting laser array having 40 light emitters, and the size of the array in a main scanning direction (m) is 0.4 mm. Unlike edge emitting lasers, surface emitting lasers do not emit light backward, and therefore it is necessary for a surface emitting laser to obtain light for monitoring by branching a light flux emitted by the surface emitting laser. In FIG. 13 and other figures, character s represents a sub-scanning direction.

Figure 14:
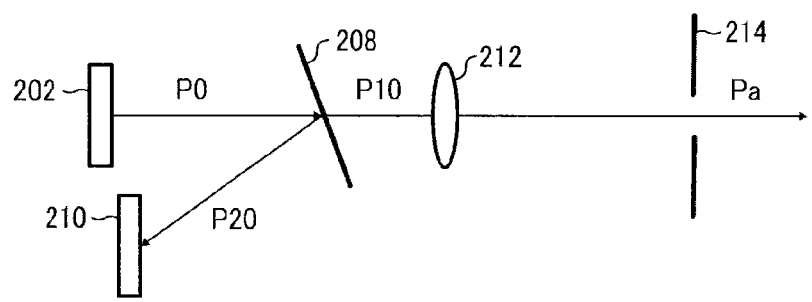
FIG. 14 is a schematic view illustrating an example of the optical layout of a light source device for use in the optical scanning device of the present invention.

FIG. 14 is a schematic view illustrating an optical scanning device of the present invention using the light source 202. Referring to FIG. 14, the surface emitting laser 202 emits light P0, and part of the emitted light is reflected by a half mirror device 208. The reflected light P20 enters a photodetector 210. By contrast, the light P10 passing through the half mirror device 208 is converged by a coupling lens 212. The light passing through the half mirror device 208 is restricted by an aperture 214 so as to be a light flux Pa, and the light Pa is guided to a light deflecting device.

Figure 15:
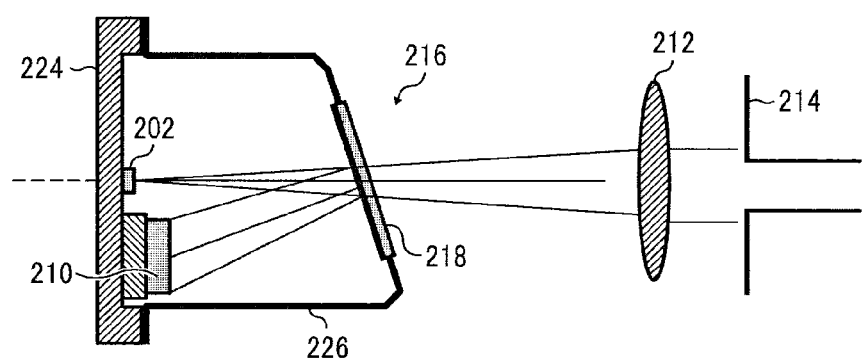
FIG. 15 is a schematic cross-sectional view illustrating the light source device illustrated in FIG. 14.

FIG. 15 illustrates a light source device 216. The light source device 216 is a sealed module. A cover glass 218 (hereinafter referred to as a glass plate) is provided to prevent the light source from being damaged and to protect the light source from oxidation and moisture absorption.

The glass plate 218 serves as the half mirror, and reflects the light P0 (in a light quantity of about 10% in this example) to be used as the light P20 for monitoring. Residual light (about 90% of the light P0 in this example) P10 is used for scanning (i.e., image writing).

Surface emitting lasers (VCSEL) cannot emit light backward unlike edge emitting lasers due to the structure thereof Therefore, a technique in which light emitted backward is used as light for monitoring cannot be used, and a branching technique in which emitted light is branched using a half mirror or the like is used. The branching technique has a drawback in that loss of light is large. In addition, surface emitting lasers (VCSEL) themselves have a drawback in that output per one light emitter is smaller than that of edge emitting lasers.

In the present invention, in order to minimize loss of light (i.e., to minimize the quantity of light used for monitoring), the reflectance of the half mirror is set so as to be not greater than 10% while using an amplifier (described later) to compensate for deficiency of the quantity of light received by the photodetector 210. In addition, non-reflection coating is made on the second surface (i.e., the surface from which the light P10 exits) of the glass plate 218 to reduce loss of light used for scanning while preventing occurrence of multiple interference within the glass plate 218.

Figure 18:
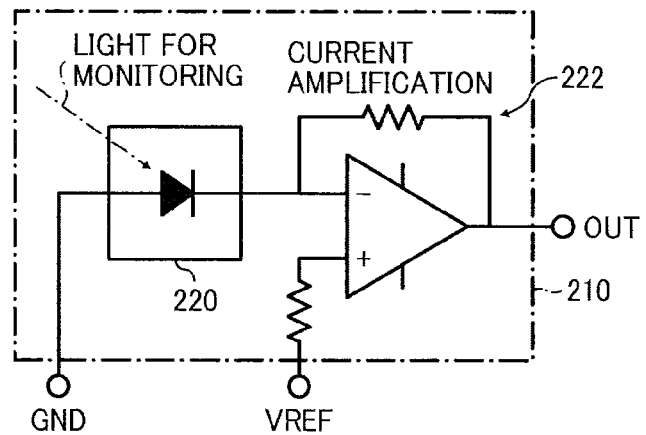
FIG. 18 is a circuit diagram illustrating an amplifier of a photodetector for use in the optical scanning device of the present invention.

FIG. 18 illustrates the photodetector 210 equipped with an amplifier. A light receiving element 220 of the photodetector 210 is a photodiode (PD), and a slight current generated by subjecting light for monitoring to photoelectric conversion is amplified to a predetermined value by an operational amplifier 222 for amplifying current, which serves as an amplifier.

In general, it is necessary for a photodetector to receive light in a quantity of about 0.02 mW without an amplifier. In addition, it is necessary for the photodetector to have a light receiving surface having an area of not less than 1.0 $mm^2$. However, in this example of the light source of the present invention, a photodiode having a smaller area than conventional photodiodes is used. Therefore, the current generated in the photodiode of the photodetector 210 is amplified to the predetermined value by the amplifier integrated with the photodiode. In this regard, since the amplifier is integrated with the photodiode 220, the length of a wire connecting the photodiode with the amplifier can be minimized, it becomes possible to prevent deterioration of response of the photodetector 210 caused by increase of resistance and floating capacitance while reducing noise. In this regard, the amplification magnification of the photodiode equipped with an amplifier is preferably not greater than about 20 to prevent increase of dark current noise.

In addition, since surface emitting lasers (VCSEL) have a relatively short resonator length and a relatively high coherency compared to edge emitting lasers, surface emitting lasers often cause a problem in that the oscillation mode thereof becomes unstable even when the quantity of light from other optical parts thereto is small (about 1%). Therefore, in a case where a surface emitting laser is arranged so as to be substantially perpendicular to the light emitting direction like an edge emitting layer, a problem in that oscillation becomes unstable, thereby making it impossible to properly perform a proper APC operation is often caused even when light for monitoring can be satisfactorily detected.

Therefore, the glass plate 218 is set so as to be slanting at an angle of not less than 10° relative to a plane perpendicular to the traveling direction of light emitted by the light source. Accordingly, it is prevented that light returned from the glass plate 218 enters the light source, thereby preventing occurrence of the problem mentioned above.

Figure 17A:
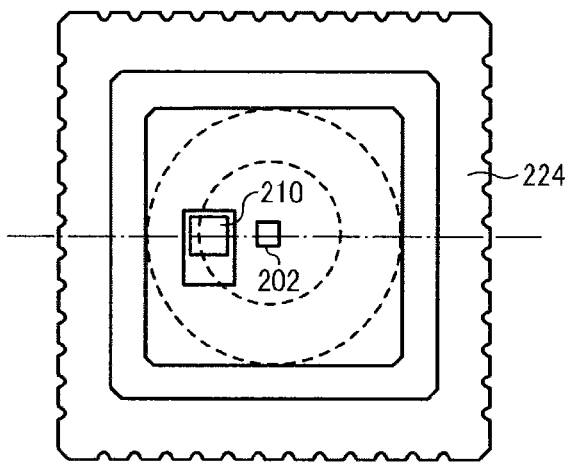
FIGS. 17A and 17B are a plan view and a cross-sectional view illustrating the light source device illustrated in FIG. 15.
Figure 17B:
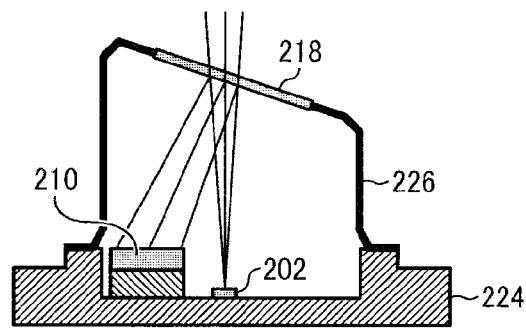

In this light source device 216 illustrated in FIG. 17B, the glass plate 218 equipped with an apertural area and a reflecting portion is arranged so as to be slanting relative to the traveling direction of light emitted by the light source. In addition, the light receiving surface of the light receiving element (photodiode) 220 is substantially parallel to the surface of the light source 202, on which light emitting lasers are arranged. In addition, the light source 202 (i.e., the surface emitting laser), the glass plate 218, and the photodetector 210 are integrated as a single module.

The light source device of the optical scanning device of the present invention has advantages over the conventional light source device disclosed in JP2009-065064 such that the number of parts constituting the device is smaller, and the light path from the light source to the photodetector via the glass plate can be shortened, thereby making it possible to miniaturize the device while reducing the costs thereof. In addition, since the light path is short, light for monitoring can be satisfactorily focused on the photodetector even when the positional accuracy of the optical elements (such as the surface emitting laser, the glass plate and the photodetector) is not so good. Namely, it is not necessary for the light source device that parts are arranged with high positional accuracy.

As illustrated in FIG. 17B, the surface emitting laser 202, and the photodetector 210 are provided on a light source package 224 made of a resin or a ceramic. In this regard, the members are set with high positional accuracy of about tens of micrometers using a die bonding technology for use in the semiconductor field. Next, the glass plate 218 is provided on a metal CAN package 226 so as to be slanting relative to the light emitting direction. In this regard, a slanting portion having a predetermined slanting angle is previously formed on the CAN package 226, and the glass plate 218 is fixed to the slanting portion with an adhesive or the like. Since the light path from the surface emitting laser 202 to the photodetector 210 via the glass plate 218 is short, it is possible to set the glass plate with regular accuracy of about 1° to 2°.

Next, the CAN package 26, to which the glass plate 218 is attached, is fixed to the light source package 224 by melt-electrodeposition or the like so that the resultant light source device 216 is sealed. In this regard, if necessary, the sealed space of the light source device 216 may be evacuated or filled with a gas such as dry air and nitrogen gas to protect the light source device from oxidation and moisture absorption.

As mentioned above, the light source device 216 in which the light source, the glass plate, and the photodetector are integrated, can emit multiple light beams two-dimensionally like conventional edge emitting lasers. The light source device 216 has advantages over conventional light sources, in which light flux emitted by a face emitting laser is branched to perform monitoring using another optics, that the number of constituent parts is smaller, the size is smaller, adjustment can be easily performed, and the cost is much lower.

As illustrated in FIGS. 14 and 15, light flux passing through the glass plate 218 equipped with an apertural area is converted to be substantially parallel light by the coupling lens 212. After converted to parallel light, the light flux is subjected to beam width restriction by the aperture 214, resulting in formation of a light beam. In this regard, the aperture 214 is designed so that the resultant light beam has a desired beam spot on the scanning surface (i.e., the surface of a photoreceptor).

Figure 20:
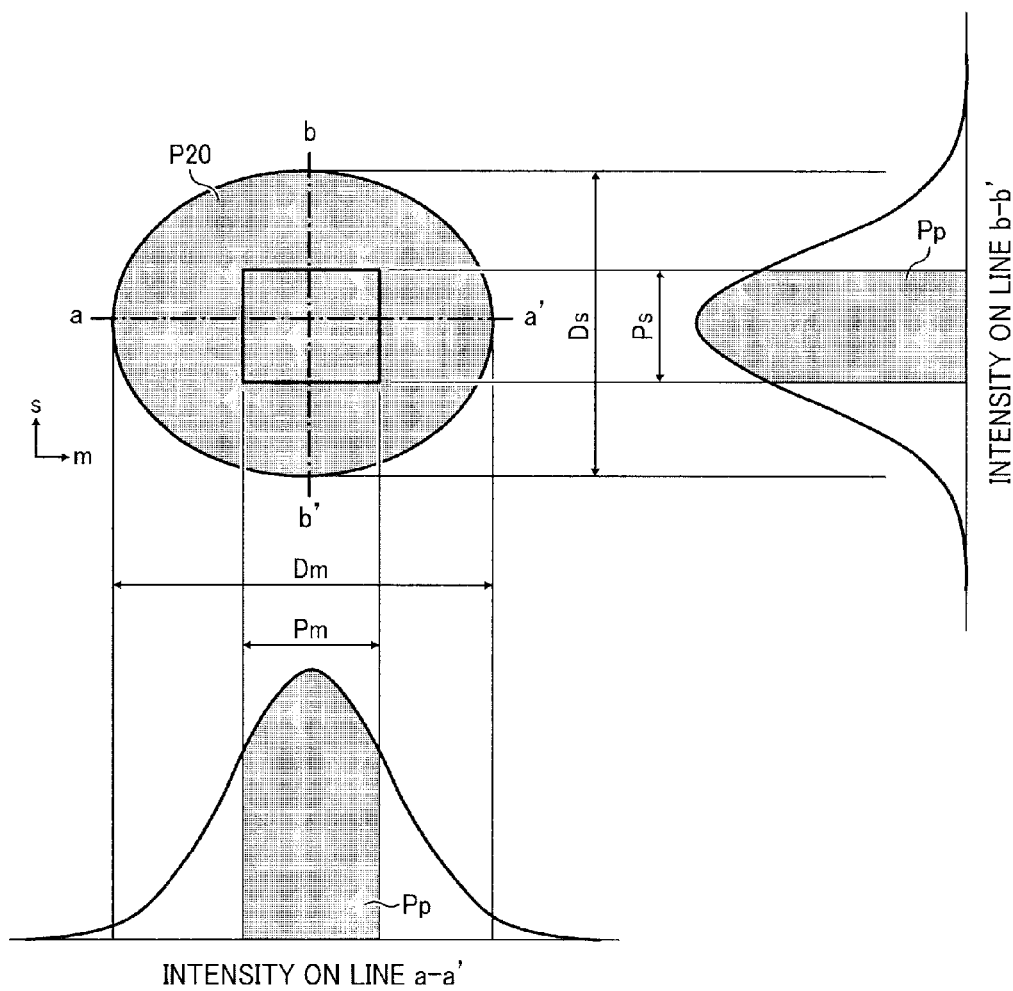
FIG. 20 is a schematic view illustrating light intensity distribution of light on a photodetector.

As illustrated in FIG. 20, the light beam P20 has an elliptical form on the photodetector, wherein the long axis and the short axis thereof are Dm and Ds. The light receiving element (photodiode) 220 having a rectangular form and having an area of Sp (=Pm×Ps) receives the light flux as light for monitoring. In this light source device, the following inequation (2) is satisfied:

$$0.5(mm^2) > Sp(mm^2) > 0.1(mm^2) \qquad (2).$$

As the light receiving area of the light receiving element is large, it is possible to obtain light for monitoring having a desired light quantity at a high S/N. However, when the light receiving area is large, it is difficult to contain the light receiving element in one package, and therefore a small and low-cost light source device cannot be provided.

In particular, when the face emitting layer has a characteristic such that the divergence angle property of light emitted thereby varies when the environmental temperature changes and/or after the face emitting laser is repeatedly used for a long period of time, a problem in that the quantity of light Pa passing through the aperture 214 is not equivalent to the quantity of light for monitoring Pp at the rectangular portion of the light receiving element 220 (i.e., the ratio of Pp/Pa is not constant), resulting in performance of an inaccurate APC operation, is caused.

In order to prevent occurrence of the problem, in this light source device, a photodetector equipped with an amplifier is used while satisfying the inequation (2) mentioned above, and therefore it becomes possible to obtain light having a light quantity sufficient for securely performing the APC operation and to stably perform the APC operation even though the divergence angle property of light emitted by the light source varies when the environmental temperature changes and/or after the light source is repeatedly used for a long period of time. Thus, a light source device, which uses a surface emitting laser and which has a small-sized and low-cost monitor, can be provided.

When the area Sp of the rectangular portion of the light receiving element 220 is greater than the upper limit (0.5 mm²), the ratio of the quantity of light used for scanning (writing) to the quantity of light used for monitoring cannot be controlled so as to be constant. Particularly, the APC operation cannot be accurately performed due to variation of divergence angle property of emitted light when the environmental temperature changes or after the light source is repeatedly used for a long period of time. In contrast, when the area Sp of the rectangular portion of the light receiving element 220 is less than the lower limit (0.1 mm²), it is difficult to obtain light having a light quantity sufficient for securely performing the APC operation, and it is difficult to stably perform the APC operation due to dark current noise even when received light is amplified by the amplifier.

Figure 19:
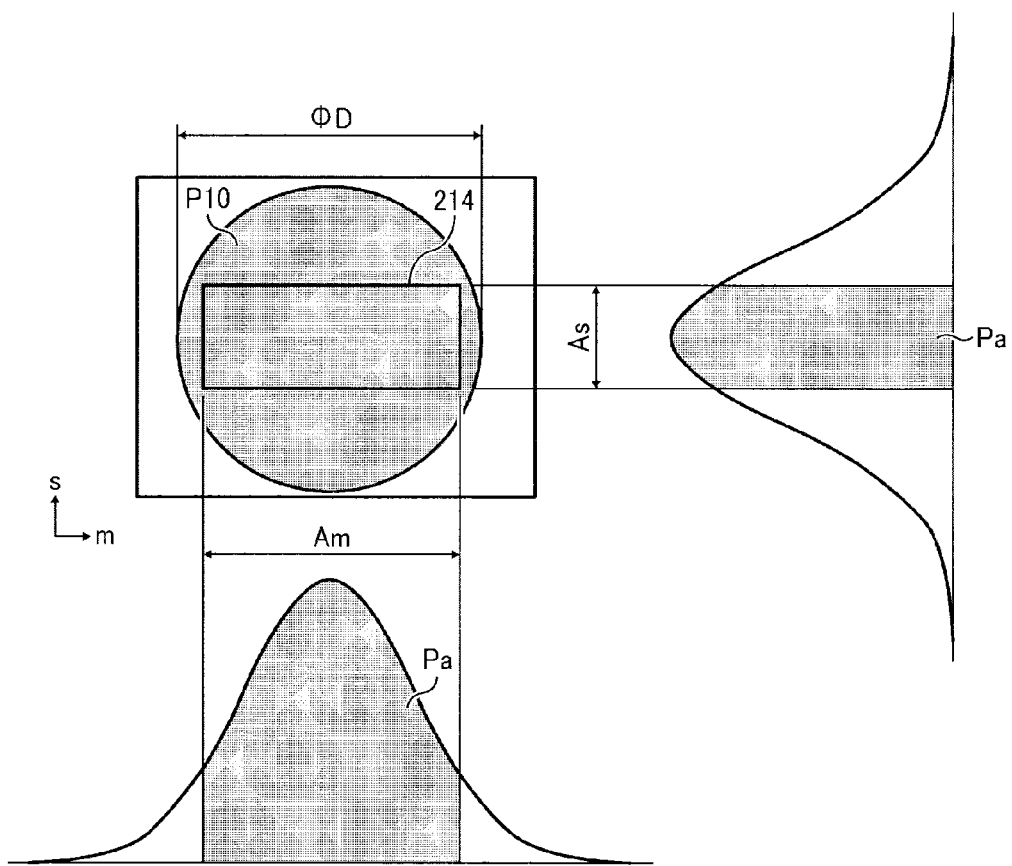
FIG. 19 is a schematic view illustrating light intensity distribution of light on an aperture.

As illustrated in FIG. 19, the light beam on the aperture has a circular form having a diameter of D. The width of the light flux is restricted by the aperture having a rectangular opening having a area of Sa (=Am×As) so that a light beam having a desired beam spot on the scanning surface, i.e., the surface of the photoreceptor. In contrast, as illustrated in FIG. 20, the light beam for monitoring has an elliptical form on the photodetector, wherein the long axis and the short axis thereof are Dm and Ds, respectivley. The light beam for monitoring P20 is received by the light receiving element, which has a rectangular form and which has an area of Sp (=Pm×Ps).

In this regard, the length Am (and As) is determined from the width of the beam strength distribution curve when the curve is cut by a line $y=1/e^2$, wherein the height of the peak of the beam strength distribution curve is 1.

The numerical aperture (NAa) on the light receiving element is represented by the following approximate equation:

$$NAa=(Sp^{1/2}/2L)$$

wherein L represents the light path of from the light source to the light receiving element via the glass plate.

In contrast, the numerical aperture (NAp) on the light receiving element is represented by the following approximate equation:

$$NAp=(Sa^{1/2}/2f)$$

wherein f represents the focal length of the coupling lens.

In the light source device of the optical scanning device of the present invention, the following inequation (3) is satisfied:

$$1.3>[(Sp^{1/2}/L)/(Sa^{1/2}/f)]>0.7 \quad (3).$$

Figure 16:
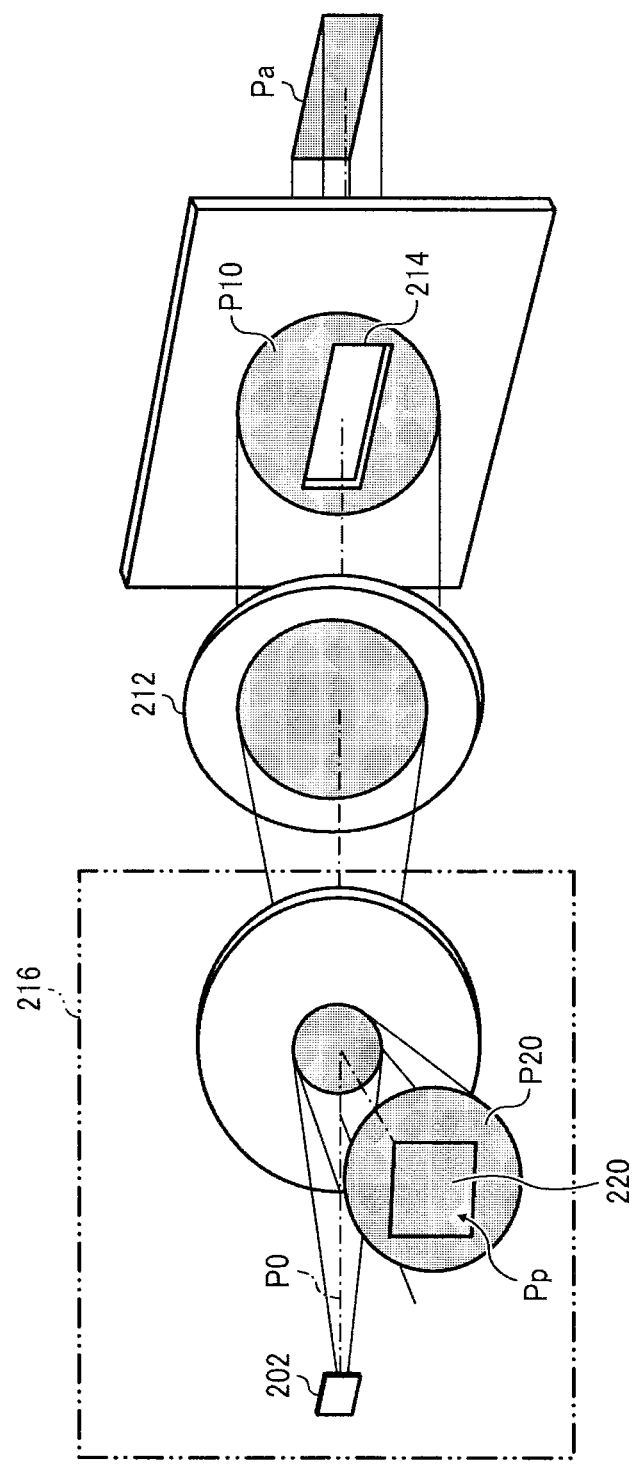
FIG. 16 is a schematic view illustrating the shapes of a light flux emitted by a surface emitting laser at each stage.

In particular, when the divergence angle property of light emitted by the surface emitting laser varies when the environmental temperature changes and/or after the surface emitting laser is repeatedly used for a long period of time, the quantity of light Pa passing through the aperture 214 is not equivalent to the quantity of light for monitoring Pp at the rectangular portion of the light receiving element 220 (illustrated in FIG. 16), resulting in performance of an inaccurate APC operation.

By controlling such that the power (energy) of light Pa passing through the aperture 214 is substantially equivalent to the power (energy) of light for monitoring Pp at the rectangular portion of the light receiving element 220 (illustrated in FIG. 16), the APC operation can be stably performed.

In equation (3), the NA ratio $[(Sp^{1/2}/L)/(Sa^{1/2}/f)]$ is 1.0 when the power of light for scanning (writing) is equivalent to the power of light for monitoring. Therefore, by controlling the NA ratio $[(Sp^{1/2}/L)/(Sa^{1/2}/f)]$ in a range of from 1.3 to 0.7, the APC operation can be stably performed. In other words, when the NA ratio is in a range of ±30% from the equivalent NA ratio, a good APC operation can be performed, i.e., change of the image density of output images is not noticeable.

In particular, in face emitting lasers the quantity of light Pa passing through the aperture 214 and the quantity of light for monitoring Pp on the light receiving element change due to change of the divergence angle of light beams emitted by the multiple light emitters when the environmental temperature changes and/or after the surface emitting lasers are repeatedly used for a long period of time. Therefore, an image density problem is caused in that images having different image densities such as banded solid images with different image densities and images which are recorded in a page and which includes different image density portions are formed.

The light source of the present invention can control the monitor light quantity variation, which means the ratio of the power of light for monitoring to the power of light for scanning (writing) in the APC operation and which is defined by $|(\Delta Pp/\Delta Pa)-1|$ so as to be not greater than 5%. Therefore, occurrence of the image density problem can be prevented, i.e., images without noticeable image density difference can be produced.

Therefore it is preferable that the following inequation (4) is satisfied:

$$0.05>|(\Delta Pp/\Delta Pa)-1| \quad (4),$$

wherein ΔPp represents change of the quantity of light Pa passing through the aperture, and ΔPa represents change of the quantity of light Pp for monitoring, when the divergence angle changes by Δθ.

Figure 21:
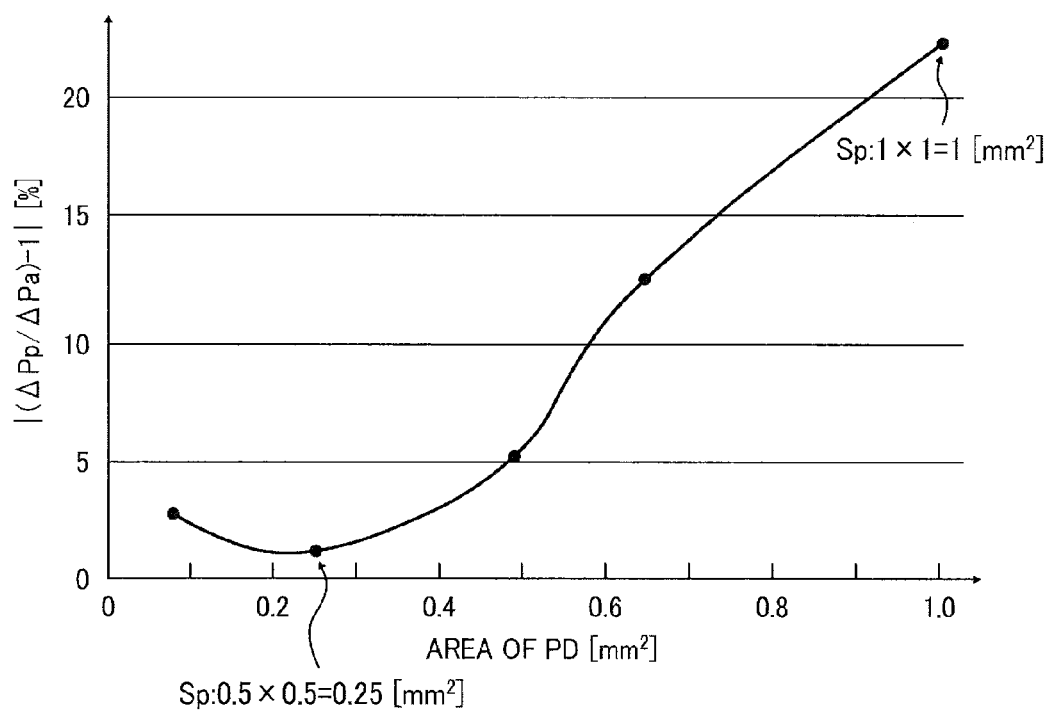
FIG. 21 is a graph showing variation of light quantity of monitoring light in an example of the light source device for use in the optical scanning device of the present invention.

FIG. 21 is a graph showing the relation between the area of the light receiving element (photodiode) and the monitor light quantity variation in an example of the light source device for use in the present invention. It can be easily understood from FIG. 21 that the monitor light quantity variation $|(\Delta Pp/\Delta Pa)-1|$ is not greater than 5% when the area of the light receiving element (photodiode) is 0.5 mm².

In this regard, since the quantity of light for monitoring is small, it is necessary to use an amplifier to perform amplification while satisfying the inequation (4).

As mentioned above, in order to stably perform the APC operation, the monitor light quantity variation is controlled so as to be not greater than 5%. When the monitor light quantity variation is greater than 5%, the output images have noticeable image density differences, i.e., high quality images cannot be produced.

Example 1

A light source device, which has such a structure as illustrated in FIGS. 14, 16, 19 and 20 and whose conditions are as follows, was provided.

Light path length (L) between the surface of light emitters and the glass plate: 8.3 mm Focal length (f) of the coupling lens: 45 mm Length (Am) of the opening of the aperture in the direction corresponding to the main scanning direction: 5.5 mm Length (As) of the opening of the aperture in the direction corresponding to the sub-scanning direction: 1.2 mm Area (Sa) of opening of the aperture: 6.6 mm²

Length (Pm) of the light receiving element in the direction corresponding to the main scanning direction: 0.5 mm Length (Ps) of the light receiving element in the direction corresponding to the sub-scanning direction: 0.5 mm Area Sp of the light receiving element: 0.25 mm²

Example 2

A light source device, which has such a structure as illustrated in FIGS. 14, 16, 19 and 20 and which has the following conditions, was provided.

Light path length (L) between the surface of light emitters and the glass plate: 10.5 mm Focal length (f) of the coupling lens: 45 mm Length (Am) of the opening of the aperture in the direction corresponding to the main scanning direction: 5.0 mm Length (As) of the opening of the aperture in the direction corresponding to the sub-scanning direction: 0.8 mm Area Sa of the opening of the aperture: 4.0 mm²

Length (Pm) of the light receiving element in the direction corresponding to the main scanning direction: 0.7 mm Length (Ps) of the light receiving element in the direction corresponding to the sub-scanning direction: 0.7 mm Area Sp of the light receiving element: 0.49 mm²

In the light source devices of Examples 1 and 2, the above-mentioned inequation (2) is satisfied because the area Sp of the light receiving element is 0.25 mm² and 0.49 mm², respectively. Therefore, it is possible to contain the light receiving element in one package, and therefore a small and low-cost light source device can be provided. In addition, a stable APC operation can be performed even when the divergence angle varies when the environmental temperature changes and/or after the face emitting laser is repeatedly used for a long period of time.

In addition, the inequation (3) is also satisfied as follows:

$[(Sp^{1/2}/L)/(Sa^{1/2}/f)]=(0.25^{1/2}/8.3)/(6.6^{1/2}/45)=1.06$   Example 1

$[(Sp^{1/2}/L)/(Sa^{1/2}/f)]=(0.49^{1/2}/10.5)/(4^{1/2}/38)=1.26$   Example 2

Since the above-mentioned inequation (3) is also satisfied in Examples 1 and 2, the condition that the power of light for writing is equivalent to the power of light for monitoring is maintained, and therefore the APC operation can be stably performed even though the divergence angle varies when the environmental temperature changes and/or after the face emitting laser is repeatedly used for a long period of time.

As mentioned above, the monitor light quantity variation is defined as $|(\Delta Pp/\Delta Pa)-1|$, wherein $\Delta Pp$ represents change of the quantity of light Pa passing through the aperture, and $\Delta Pa$ represents change of the quantity of light Pp for monitoring, when the divergence angle changes by $\Delta\theta(=2°)$ due to change of the environmental temperature.

The result of a simulation in which only the area Sp of the light receiving element (photodiode (PD)) is changed under the condition of Example 1 is illustrated in FIG. 21. Under this condition, the monitor light quantity variation is minimum when the area Sp (i.e., the area of the photodiode (PD)) is about 0.25 mm$^2$. In order to control the monitor light quantity variation so as to be not greater than 5% so that the image density change is not noticeable, the area Sp is preferably not greater than 0.5 mm$^2$.

Thus, according to the present invention, the quantity of light for writing and the quantity of light for monitoring are controlled so as to be constant, and therefore the APC operation can be stably performed. In addition, a small-sized and low-cost VCSEL light source device equipped with a monitor can be provided.

Figure 22:
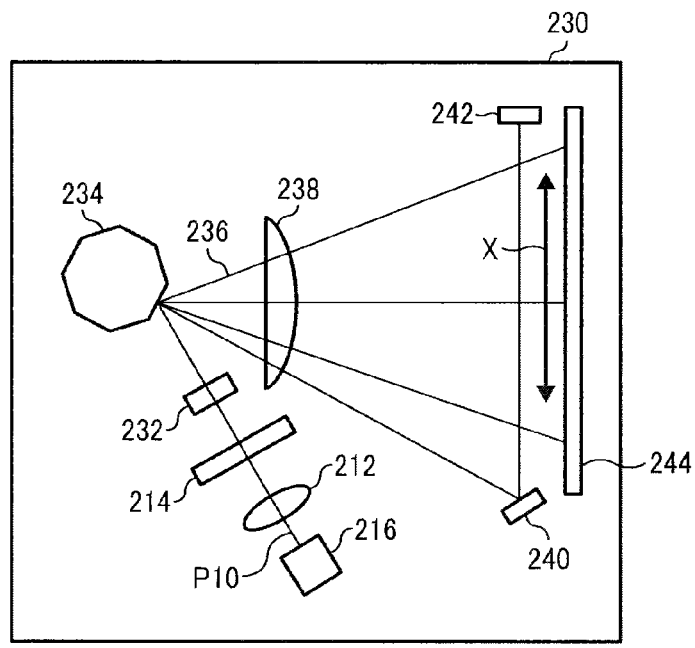
FIG. 22 is a schematic plan view illustrating another example of the optical scanning device of the present invention.

Next, an optical scanning device using the above-mentioned light source device will be described by reference to FIG. 22. In an optical scanning device 230 illustrated in FIG. 22, a light beam P10 emitted by the light source device 216 is converted to parallel light by the coupling lens 212, and then passes through the aperture 214 serving as a beam shaping device to be shaped so as to have a desired beam diameter. After the shaped light beam passes through a cylindrical lens 232 having a predetermined curvature only in the sub-scanning direction, the light beam is deflected by a polygon mirror 234 serving as a deflector, resulting in formation of a deflected light beam 236.

The deflected light beam 236 passes through an Fθ lens 238 serving as part of a scanning optics, and is then reflected by a light returning mirror 244 also serving as part of the scanning optics so as to be focused on a surface of a photoreceptor, thereby forming an electrostatic latent image on the photoreceptor. In FIG. 22, a direction X indicated by an arrow represents the main scanning direction. Part of the deflected and scanned light beam is guided to a photodetector 242 so that the light beam P10 emitted by the light source device 216 starts to be modulated according to the signal generated by the photodetector 242.

Next, an example of the image forming apparatus of the present invention using the above-mentioned optical scanning device will be described by reference to FIG. 23.

Figure 23:
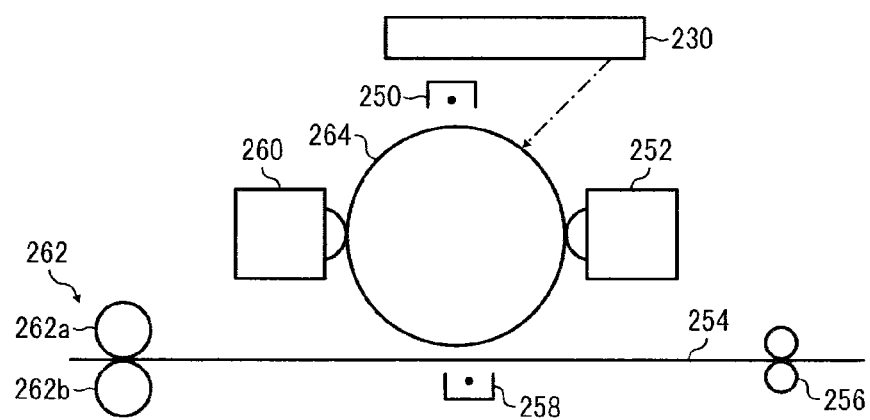
FIG. 23 is a schematic plan view illustrating yet another example of the image forming apparatus of the present invention.

In the image forming apparatus illustrated in FIG. 23, a photoreceptor drum 264 is rotated clockwise by a motor at a constant peripheral speed. After a charger 250 evenly charges a surface of the photoreceptor drum 264 so that the surface has a charge with a predetermined polarity, the optical scanning device 230 irradiates the charged surface (scanning surface) of the photoreceptor drum 264 with light beams to form an electrostatic latent image corresponding to the image information.

A developing device 252 is provided on a downstream side from the irradiating position relative to the rotation direction of the photoreceptor drum 264 to develop the electrostatic latent image with a developer including a toner to form a toner image on the surface of the photoreceptor drum 264. Meanwhile, a recording material sheet 254 is fed by a pair of feeding rollers 256 toward the photoreceptor drum 264.

Next, a transferring device 258 applies a charge having a polarity opposite to that of the toner to the recording material sheet 254 to transfer the toner image onto the recording material sheet 254.

After the toner image is transferred, residual toner remaining on the photoreceptor drum 264 is removed by a cleaner 260 so that the photoreceptor drum is ready for the next image forming operation.

The recording material sheet 254 bearing the toner image thereon is fed to a fixing device 262, which includes a heat roller 262a subjected to heat controlling to have a predetermined temperature, and a pressure roller 262b contacted with the heat roller 262a. When the recording material sheet 254 bearing the toner image thereon passes through the nip between the heat roller 262a and the pressure roller 262b, the toner image is melted upon receipt of heat and pressure, resulting in fixation of the toner image on the recording material sheet 254. The recording material sheet 254 bearing the fixed toner image thereon is then discharged from the image forming apparatus.

The above-mentioned example of the image forming apparatus illustrated in FIG. 23 is a monochromatic image forming apparatus, but the image forming apparatus of the present invention is not limited thereto. For example, the image forming apparatus of the present invention may be a tandem image forming apparatus in which multiple photoreceptors are arranged side by side.

Additional modifications and variations of the present invention are possible in light of the above teachings. It is therefore to be understood that within the scope of the appended claims the invention may be practiced other than as specifically described herein.

What is claimed is:

1. An optical scanning device comprising:
   a light source having multiple light emitters to emit light beams;
   an optical element located on a light path of the light beams emitted by the light source to reflect part of the light beams while transmitting residue of the light beams;
   a photoreceiver located on a light path of the light beams reflected by the optical element and including a photodetector having a light receiving surface to receive the light beams reflected by the optical element;
   an aperture having an opening to shape the light beams passing through the optical element;
   a light deflector to deflect the light beams passing through the opening of the aperture;
   a scanning optics to guide the deflected light beams to a surface of an object to scan the surface with the light beams; and
   a coupling lens to converge the light beams passing through the optical element before the light beams pass through the opening of the aperture, wherein the optical scanning device satisfies the following relation: $1.3>[(Sp^{1/2}/L)/$ $(Sa^{1/2}/f)] > 0.7$, wherein Sp represents an area of the light receiving surface of the photodetector, L represents a light path length between the light source and the photodetector, Sa represents an area of the opening of the aperture, and f represents a focal length of the coupling lens, wherein there is no aperture in a light path from an exit face of the light source to the photodetector via the optical element, and a size of the light receiving surface of the photodetector is determined in such a manner that even when a full width at half maximum (FWHM) of each of the light beams emitted by the light source changes, a rate of change of a ratio of a light quantity of the light beams received by the photodetector to a light quantity of the light beams passing through the opening of the aperture is not greater than 4% and is greater than 0%, the light source is a face emitting laser, the optical element includes a glass plate and a half mirror locate on the glass plate and the photoreceiver further includes an amplifier to amplify a current generated by the photodetector when receiving the light beams reflected by the half mirror, wherein the glass plate protects the light source and the photoreceiver, and the half mirror is slanting relative to a plane perpendicular to a travelling direction of the light beams emitted by the face emitting laser while having a reflectance of not greater than 10%, and wherein the face emitting laser, the glass plate, and the photodetector are integrated as a single module.

2. The optical scanning device according to claim 1, wherein a surface of the light source, from which the light beams are emitted, is substantially parallel to the light receiving surface of the photodetector.

3. The optical scanning device according to claim 1, wherein the optical scanning device satisfies the following relation: $0.5(mm^2) > Sp(mm^2) > 0.1(mm^2)$, wherein Sp represents an area of the light receiving surface of the photodetector.

4. The optical scanning device according to claim 1, further comprising:
a coupling lens to converge the light beams passing through the optical element before the light beams pass through the aperture, wherein the optical scanning device satisfies the following relation: $0.05 > |(\Delta Pp/\Delta Pa) - 1|$, wherein $\Delta Pp$ represents a change of the light quantity of the light beams passing through the opening of the aperture, and $\Delta Pa$ represents a change of the light quantity of the light beams received by the photodetector, when a divergence angle θ of the light beams emitted by the light source changes.

5. An image forming apparatus comprising:
at least one image bearing member; and the optical scanning device according to claim 1 to irradiate a surface of the at least one image bearing member with light beams emitted by the light source while modulated according to image information to form an electrostatic latent image on the surface of the at least one image bearing member.

6. The image forming apparatus according to claim 5, wherein the image information is information on multiple color images.

7. An image forming apparatus comprising:
at least one image bearing member; and
the optical scanning device according to claim 1 to irradiate a surface of the at least one image bearing member with light beams emitted by the light source while modulated according to image information to form an electrostatic latent image on the surface of the at least one image bearing member.

8. The image forming apparatus according to claim 1, wherein a light quantity of each of the light beams received by the light receiving surface of the photodetector is not less than 0.01 mW.

9. A method for designing an optical scanning device, which includes
a light source having multiple light emitters to emit light beams;
an optical element located on a light path of the light beams emitted by the light source to reflect part of the light beams while transmitting residue of the light beams;
a photoreceiver located on a light path of the light beams reflected by the optical element and including a photodetector having a light receiving surface to receive the light beams reflected by the optical element such that there is no aperture in a light path from an exit face of the light source to the photodetector via the optical element;
an aperture having an opening to shape the light beams passing through the optical element;
a light deflector to deflect the light beams passing through the opening of the aperture;
a scanning optics to guide the deflected light beams to the surface of the object; and
a coupling lens to converge the light beams passing through the optical element before the light beams pass through the opening of the aperture, wherein the optical scanning device satisfies the following relation: $1.3 > [(Sp^{1/2}/L)/(Sa^{1/2}/f)] > 0.7$, wherein Sp represents an area of the light receiving surface of the photodetector, L represents a light path length between the light source and the photodetector, Sa represents an area of the opening of the aperture, and f represents a focal length of the coupling lens,
wherein the light source is a face emitting laser, the optical element includes a glass plate and a half mirror locate on the glass plate, and the photoreceiver further includes an amplifier to amplify a current generated by the photodetector when receiving the light beams reflected by the half mirror, wherein the glass plate protects the light source and the photoreceiver, and the half mirror is slanting relative to a plane perpendicular to a travelling direction of the light beams emitted by the face emitting laser while having a reflectance of not greater than 10%, and wherein the face emitting laser, the glass plate, and the photodetector are integrated as a single module,
said method comprising:
determining a size of the light receiving surface of the photodetector in such a manner that even when a full width at half maximum (FWHM) of each of the light beams emitted by the light source changes, a rate of change of a ratio of a light quantity of the light beams received by the photodetector to a light quantity of the light beams passing through the aperture is not greater than 4% and is greater than 0%.

10. The method according to claim 9, wherein a light quantity of each of the light beams received by the light receiving surface of the photodetector is not less than 0.01 mW.

* * * * *